(12) United States Patent
Chen et al.

(10) Patent No.: US 8,235,139 B2
(45) Date of Patent: Aug. 7, 2012

(54) POWER TOOL

(75) Inventors: Chengzhong Chen, Jiangsu (CN);
Hongfeng Zhong, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 241 days.

(21) Appl. No.: 12/519,928

(22) PCT Filed: Dec. 18, 2007

(86) PCT No.: PCT/CN2007/003667
§ 371 (c)(1),
(2), (4) Date: Oct. 29, 2009

(87) PCT Pub. No.: WO2008/074221
PCT Pub. Date: Jun. 26, 2008

(65) Prior Publication Data
US 2010/0078187 A1    Apr. 1, 2010

(30) Foreign Application Priority Data

Dec. 21, 2006 (CN) .......................... 2006 1 0166448

(51) Int. Cl.
*B25F 5/00* (2006.01)

(52) U.S. Cl. ........ 173/213; 173/216; 173/217; 173/164; 83/58; 409/231; 409/232; 408/239 R

(58) Field of Classification Search .......... 173/216–217, 173/164; 83/5, 68, 6–59; 310/50; 409/231–232; 408/239 R
See application file for complete search history.

(56) References Cited

U.S. PATENT DOCUMENTS

| | | | |
|---|---|---|---|
| 4,400,995 A * | 8/1983 | Palm | 74/527 |
| 5,732,805 A | 3/1998 | Nakamura | |
| 5,984,022 A | 11/1999 | Harman, Jr. et al. | |
| 6,213,695 B1 * | 4/2001 | Breitenmoser | 409/231 |
| 6,488,451 B1 * | 12/2002 | Hartman | 408/124 |
| 6,702,090 B2 * | 3/2004 | Nakamura et al. | 192/223.2 |
| 6,793,023 B2 * | 9/2004 | Holzer et al. | 173/178 |
| 7,134,509 B2 * | 11/2006 | Rahm | 173/216 |

FOREIGN PATENT DOCUMENTS

| | | |
|---|---|---|
| CN | 1153873 | 7/1997 |
| CN | 1247791 | 3/2000 |
| CN | 1584354 | 2/2005 |
| CN | 2768425 | 4/2006 |
| CN | 2793420 | 7/2006 |
| CN | 200991884 | 12/2007 |
| JP | 10-37989 | 2/1998 |

OTHER PUBLICATIONS

International Search Report for PCT/CN2007/003667 mailed Apr. 3, 2008.

* cited by examiner

*Primary Examiner* — Paul R. Durand
*Assistant Examiner* — Michelle Lopez
(74) *Attorney, Agent, or Firm* — Howard & Howard Attorney PLLC

(57) ABSTRACT

This invention disclosed a power tool comprising housing, motor in the housing, switch fixed on the housing used to connect motor and power, output shaft connecting with operator and rotating in single direction in company with the motor driving, and locking device contained in the housing. Power tool has self-locking mechanism which can lock the output shaft no need additional tools or holding force. The locking act can be easier and safer.

14 Claims, 18 Drawing Sheets

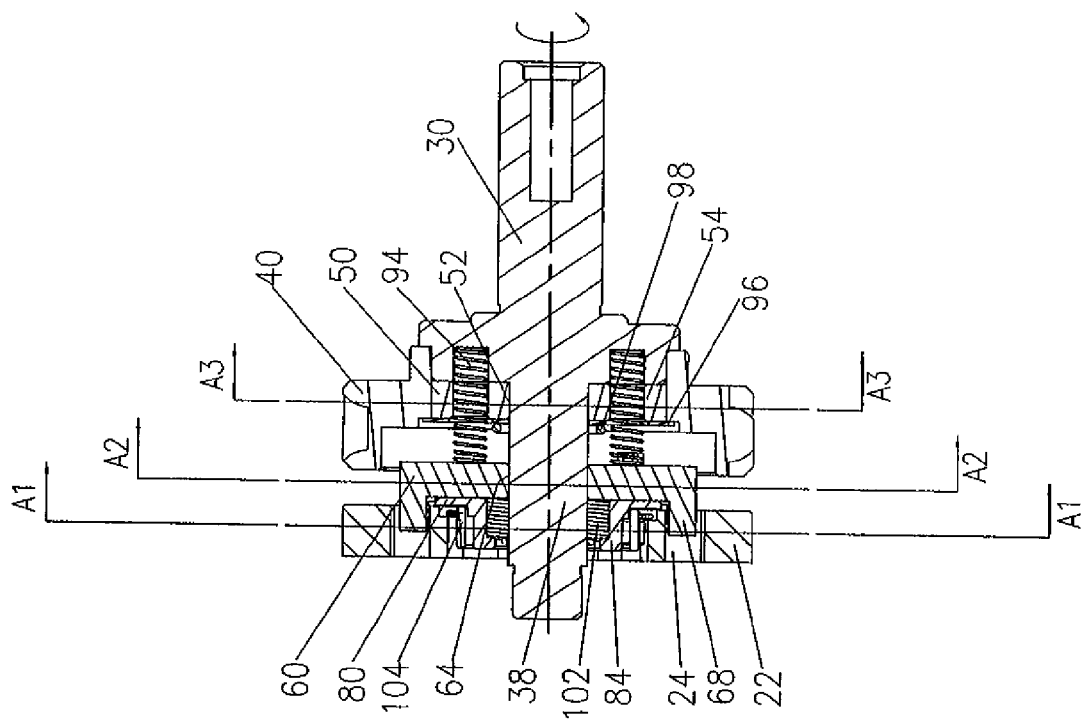
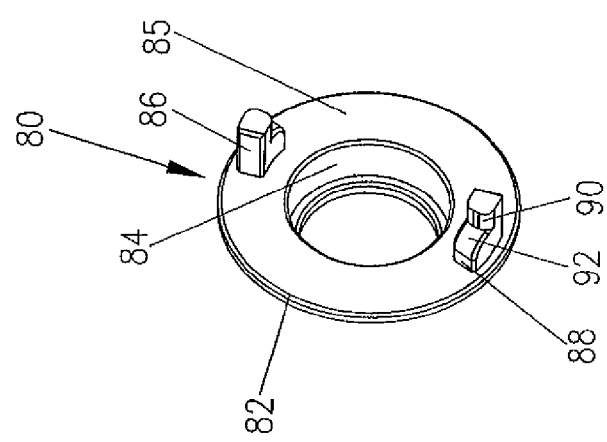
Fig. 4
Fig. 3

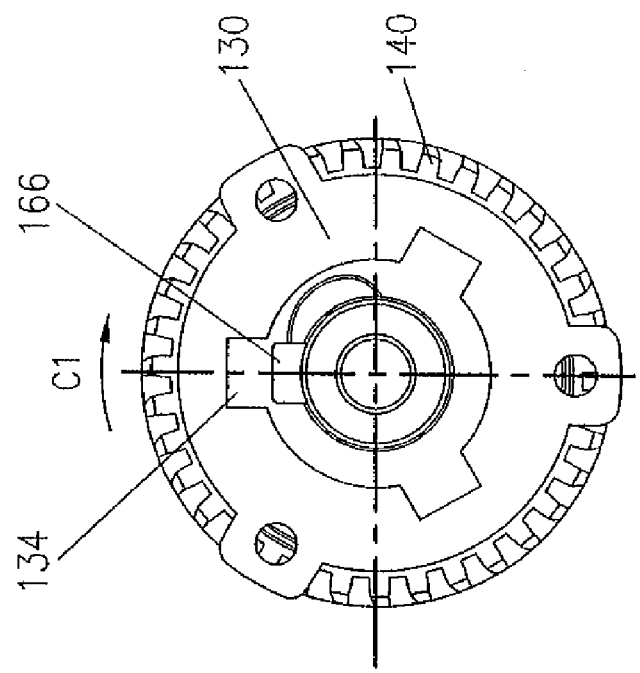
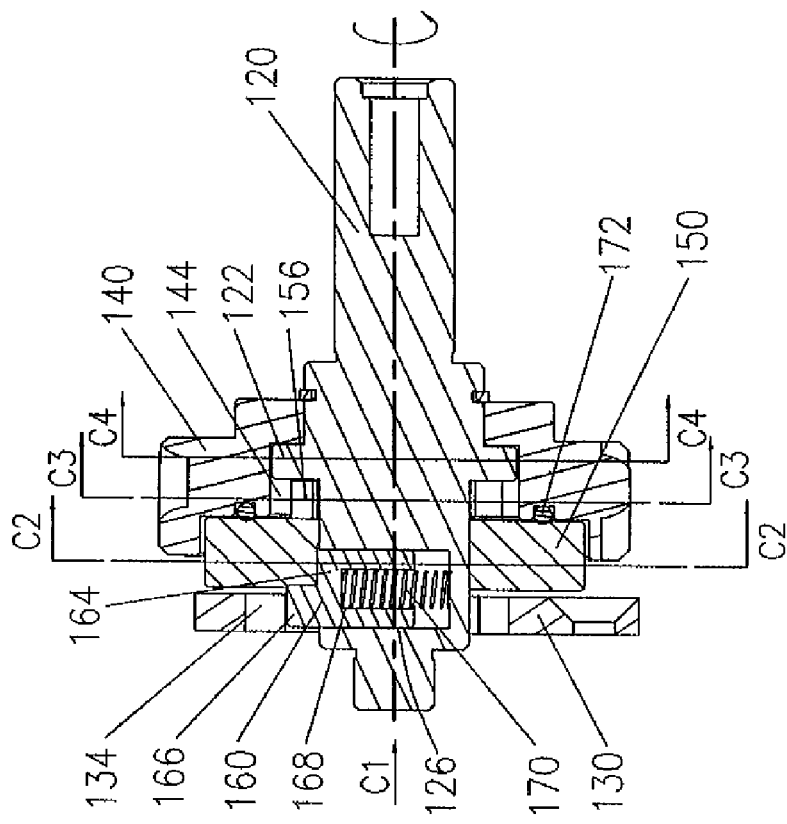
Fig. 17
Fig. 16

F-F

POWER TOOL

CROSS REFERENCE TO RELATED APPLICATION

This application claims priority to and all the advantages of International Application No. PCT/CN2007/003667, filed on Dec. 18, 2007, which claims priority to Chinese Patent Application No. 20061016448.6, filed on Dec. 21, 2006.

BACKGROUND OF THE INVENTION

1. Field of the Invention

The present invention relates to a power tool, and specially to a power tool, such as a circular saw, a grinder, a router, a sander, a miter saw and a cutting machine etc, which rotates in a single direction and can lock the output shaft when changes the work element.

2. Description of the Prior Art

A power tool, such as a circular saw, a grinder, a sander, a miter saw and a cutting machine etc, usually drives output shaft rotating by a motor, and output shaft mechanism drives a work element rotating to cut or polish. However, after a long working, the work element is easy to be worn out and need to be changed. Furthermore, the operator will change various work elements to fit various workpieces. But when use a wrench or such tool to disassemble the work element, the output shaft will rotate with the wrench accompanying, thereby it is inconvenient to disassemble the work element. The prior art has disclosed various locking device to prevent the output shaft rotating with the wrench. U.S. Pat. No. 5,430,944 discloses a circular saw which comprises a disc with a slot fixedly connected to a output shaft, and a locking pin located in a housing which can be pressed into the slot to prevent the output shaft rotating by an actuating pole manually sliding-operated by an operator. When the operator releases the actuating pole, the locking pin is biased to withdraw from the slot by a torsion spring and permit the output shaft rotating. But the output shaft locking mechanism has more components, and more complex configuration, and such a manual operation requires a hand of the operator to operate the actuating pole for locking the output shaft and the other hand to disassemble the work element with a wrench. Such a manual operation is arduous and not friendly to the operator. DE Patent No. 19938299A1 discloses a circular saw which comprises a spindle locking mechanism located in an axial hole of a drive spindle such that a wrench is inserted into the hole to disassemble a work element, which constantly pushes the output shaft locking mechanism axially moving to mesh with a motor fan for locking the output shaft. When taking out the wrench, the output shaft locking mechanism is biased to release the drive spindle by a torsion spring. Such output shaft locking mechanism, which uses a wrench to disassemble the work element and lock the output shaft simultaneously, is very dangerous specially as an operator forgets to take out the wrench and actuates the motor, the wrench maybe thrown out in a high speed to hurt the operator, or the wrench still prevents the output shaft rotating so as to hurt the motor.

BRIEF SUMMARY OF THE INVENTION

One technical problem to be solved by the present invention is to provide a power tool, which comprises a output shaft locking mechanism that can locks the output shaft without tools, and the operator need not to press an external maintain force.

A technical solution of the present invention is to provide a power tool comprising a housing, a motor received in the housing, a switch located in the housing and electrically coupled to the motor, an output shaft connected with a work element and driven rotating in a single direction by the motor, and output shaft locking mechanism located in the housing.

Another technical problem to be solved by the present invention is to provide a power tool, which comprises an output shaft locking mechanism that can be automatically unlocked when the motor starts work.

A further technical solution of the present invention is that the output shaft locking mechanism comprises a locking mechanism and a driving mechanism. When the switch is pressed, the driving mechanism drives the locking mechanism moving from the locking position which prevents the output shaft rotating to the unlocking position which permits the output shaft rotating.

The output shaft can be locked or unlocked separately response to switch the power source on or off such that the operator does not use a tool to lock the output shaft.

A further technical solution of the present invention is that the driving mechanism comprises a transmitting member connected to the motor and the output shaft and driven by the motor. The transmitting member is coupled with the output shaft movably.

Priority, the locking mechanism moves from the locking position to the unlocking position along an axial direction of the output shaft.

A further technical solution of the present invention is that the transmitting member has a first connecting surface. The locking mechanism has a second connecting surface separately connected to the first surface. The transmitting member rotates to cause the first connecting surface and the connecting second surface meshed with each other and drives the locking mechanism moving from the locking position to the unlocking position.

A further technical solution of the present invention is that the locking mechanism has a spring that elastically drives the locking mechanism moving from the unlocking position to the locking position when the first connecting surface separates from the second connecting surface.

Another technical problem to be solved by the present invention is to provide a power tool comprising a locking mechanism to avoid the output shaft substantially locked as soon as the motor is switched off.

A first further technical solution of the present invention is that the power tool comprises a first stopping member couples rotatablely with the output shaft in a single rotating direction. The first stopping member has at least two stopping surface. The locking mechanism couples with the difference stopping surfaces when the locking mechanism is positioned in the locking position or the unlocking position.

A second further technical solution of the invention is to provide a power tool comprising a second stopping member which couples rotatablely with the drive spindle in a single rotating direction. The second stopping member is movably connected to the transmitting member. The second stopping member has at least one cam surface defined in the inner surface of the second stopping member and radially extending along the rotating direction of the second stopping member. The cam surface at least partly couples with the outer surface of the locking mechanism. When the transmitting member rotates, the second stopping member is driven rotating to cause the cam surface to press the locking mechanism radially moving from the locking position to the unlocking position.

A second further technical solution of the invention is to provide an output shaft having a radial hole for receiving the locking mechanism. The radial hole further receives a second spring that elastically supports the locking mechanism to drive the locking mechanism radially moving from the unlocking position to the locking position when the cam surface is released.

The power tool of the invention comprises a transmitting member movably connected to the drive spindle so as to cause the transmitting member to rotate relative to the output shaft when the motor starts work. The relative rotation drives the locking mechanism moving from the locking position to the unlocking position so as to automatically unlock the locking mechanism of the power tool.

Otherwise, the power tool of the invention comprises a locking mechanism having a spring that elastically drives the locking mechanism moving form the unlocking position to the locking position, thereby the operator needn't use a tool to lock the output shaft. At the same time, it will be safer when the power tool doesn't work, the locking mechanism can be locked in the locking position.

The power tool of the invention further comprises a stopping member that can be used to prevent the locking mechanism moving from the unlocking position to locking position when the power is off and the motor's speed descends and the output shaft continuously rotates in a high speed under the act of the inertia, further prevents the output shaft substantially to be locked so as to avoid to damage the motor.

A further technical solution of the present invention is that the driving mechanism has an electromagnetic device located in the housing.

The electromagnetic device comprises a winding electrically connected to a power source. The locking mechanism comprises a movable element moving relative to the winding. When the power source switches on, the electric current of the winding makes the electromagnetic device producing electromagnetic force for driving the locking mechanism moving from the locking position to the unlocking position so as to automatically loosen the output shaft of the power tool.

Accordingly, the technical solution of the present invention is that the movable element axially moves relative to the drive spindle. The locking mechanism comprises a fixed element fixedly connected to the motor spindle. The movable element moves with respect to the fixed element from the locking position to the unlocking position.

Preferably, the movable element is made in the form of a movable disc having a plurality of surface defining teeth, and the fixed element is made in the form of a fixed disc having a plurality of surface defining teeth. When the switch is actuated, the movable disc moves to separates the teeth of the movable disc from the teeth of the fixed disc. Due to the configuration of a plurality of teeth of the movable disc, the movable disc engages or disengages with the fixed disc in a plurality of positions substantially realizing the drive spindle locking or unlocking in 360 degrees.

Another further technical solution of the invention is that the movable element radial moves relative to the output shaft. The locking mechanism comprises a fixed element fixedly connected to the output shaft. The movable element moves from the locking position to the unlocking position relative to the fixed element.

Preferably, the movable element is a pin, and the fixed element has a slot along the radial direction of the output shaft. When the switch is actuated, the pin disengages from the slot. When the switch is released, the pin and the slot of the fixed element mesh with each other.

Preferably, the locking mechanism further comprises an elastic element arranged between the winding and the movable element. The electromagnetic device further comprises an electromagnetic base in which the winding is contained. One end of the elastic element is pressed against the electromagnet base, and the other end of the elastic element is pressed against the movable element. The elastic element is a spring. The elastic force of the elastic element drives the locking mechanism moving from the unlocking position to the locking position so as to lock the output shaft without additional tools and maintain the output shaft in the locking position when the power tool doesn't work, thereby improving the safety of the power tool.

For the safety, a further technical solution of the invention is that the switch assembly comprises a first switch for controlling the motor and the second switch for controlling the electromagnetic device, when the first switch is switched off, the second switch is prolonged to switch off. Such a configuration assures that the locking mechanism moves back to the locking position after the motor is switched off so as to avoid the output shaft being locked abruptly during the speed of the output shaft gradually descending and the impact force to the drive spindle.

Preferably, the first switch and the second switch is a linkage switch which the second switch switched on and the first switch is retarded switched on. Such a configuration assures when the motor is actuated, the drive spindle is positioned in the unlocking position.

Additionally, the switch assembly further comprises a control switch series-connected with the first switch which is switched on/off after the electromagnetic device has finished the motion. Such a configuration assures that the motor is actuated after the electromagnetic device finishing the motion and avoid the impact and unsafe due to the locking mechanism finishes the moving motion completely.

BRIEF DESCRIPTION OF THE DRAWINGS

The present invention will be further described with reference to some preferred embodiments together with the attached drawings, wherein:

FIG. 3 is a rear perspective view of a first stopping member according to the first preferred embodiment of the present invention;

FIG. 4 is a cross-sectional view of the output shaft locking mechanism of the circular saw according to the first preferred embodiment of the present invention, wherein the locking mechanism is positioned at the locking position;

FIG. 16 is a cross-sectional view of the output shaft locking mechanism of the circular saw according to the second preferred embodiment of the present invention, wherein the locking mechanism is positioned in the unlocking position;

FIG. 17 is a view taking along the direction C1 of FIG. 16;

And in the drawings:

Figure 1:
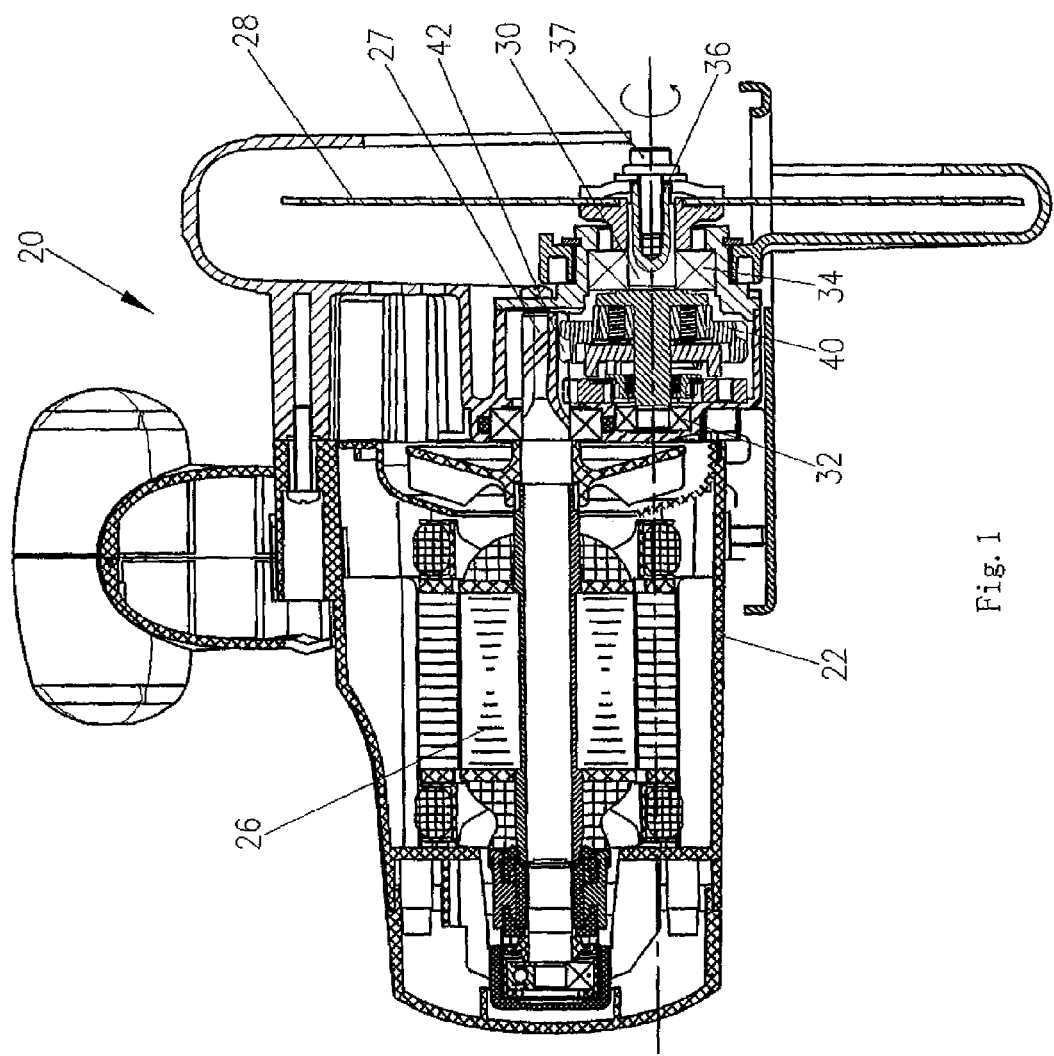
FIG. 1 is a cross-sectional view of a circular saw according to a first preferred embodiment of the present invention.

| | | | | | |
|---|---|---|---|---|---|
| 20 | circular saw | 22 | housing | 23 | central bore |
| 24 | first axial slot | 25 | cam surface | 26 | motor |
| 27 | motor shaft | 28 | saw blade | 30 | outputting shaft |
| 37 | fastener | 38 | flat portion | 32 | bearing |
| 34 | bearing | 36 | threaded hole | 40 | gear |
| 44 | first receiving space | 46 | second receiving space | 48 | first radial protrusion |
| 50 | driving member | 52 | compressed central bore | 54 | though hole |
| 60 | locking device | 62 | disc main body | 64 | compressed bore |
| 66 | second radial protrusion | 68 | first axial protrusion | 70 | arc groove |
| 80 | first stopping member | 82 | annular main body | 84 | annular column body |
| 86 | second axial protrusion | 88 | first ladder | 90 | second ladder |
| 92 | ladder surface | 94 | compressed spring | 120, 230 | outputting shaft |
| 122 | sector driving member | 126 | radial blind hole | 130 | housing |
| 132 | central bore | 134 | radial slot | 140 | gear |
| 142 | first receiving space | 144 | second receiving space | 150 | second stopping member |
| 152 | annular main body | 154 | cam surface | 156 | sector protrusion |
| 160 | locking device | 162 | column main body | 164 | first ladder |
| 166 | second ladder | 168 | blind hole | 170 | compression spring |
| 200, 300 | circular saw | 240 | transmitting member | 260 | electromagnetic assembly |
| 262 | winding | 264 | movable toothed disc | 264a | main body |
| 264b | movable end tooth | 264c | protruding portion | 266 | elastic member |
| 268 | electromagnetic base | 268a | main body | 268b | receiving groove |
| 268c | annular protrusion | 268d | inner cavity | 268e | groove |
| 269 | fixed end tooth | 270 | fixed toothed disc | 272 | end portion |
| 301 | base | 302 | guard | 303 | handle |
| 304 | electric cable | 340 | transmitting member | 342 | slot |
| 360 | electromagnetic assembly | 362 | winding | 364 | iron member |
| 365 | clip ring | 366 | elastic member | 367 | fixed frame |
| 368 | electromagnetic base | 369 | connected cable | 370 | though hole |
| 371 | end cap | 400 | router | 402 | housing |
| 404 | handle | 406 | electric cable | 408 | clamp |
| 409 | supporting rod | 410 | base | 412 | depth rod |
| 414 | adjusting knob | 416 | motor | 418 | output shaft |
| 420 | fan | 460 | electromagnetic assembly | 462 | winding |
| 464 | iron member | 465 | clip ring | 466 | elastic member |
| 468 | electromagnetic base | 469 | connected cable | 470 | blind hole |
| K1 | first switch | K2 | second switch | K3 | third switch |
| K4 | control switch | | | | |

DETAILED DESCRIPTION OF THE PREFERRED EMBODIMENT

The present invention will be further described a shaft locking mechanism of a power tool with reference to a preferred embodiment in which an circular saw is taken as an example. The present invention can be also used in a grinder, a router, a sander, a miter saw and a cutting machine. According to a different work situation of a power tool, the output shaft of the power tool can be arranged parallel to a motor shaft or perpendicular to a motor shaft, even form a angle with the motor shaft. But the position between the outputting shaft and the motor shaft don't effect the detailed using of the invention. Generally, a circular saw has an output shaft parallel to a motor shaft, and a grinder has an output shaft perpendicular to a motor shaft. According to the present invention, a variety of power tool may have a shaft locking mechanism in a different position.

The shaft locking mechanism of the present invention is an automatic locking mechanism, thereby an operator doesn't use a special tool to lock the outputting shaft in a nonrotatable position and needn't press an external maintain force to maintain the locking situation.

The automatically locking mechanism of the present invention comprises a locking device and a driving device, when a switch is actuated, the driving device driving the locking device moving from the locking position that restrains the output shaft rotating to the unlocking position that allows the output shaft rotating. In the following different embodiments, the driving device and the locking device respectively responses to a different structure.

Referring to FIG. 1, the circular saw 20 according to a first preferred embodiment of the present invention comprises a housing 22, a motor 26 having a motor shaft 27 contained in the housing 22, a switch (not shown) located in the housing 22 and electric connected to the motor 26, an outputting shaft 30 connecting a saw blade 28, the output shaft 30 rotatablely mounted in the housing 22 via bearings 32 and 34, one end of the output shaft 30 having a threaded hole 36 that is in threaded engagement with a fastener 37 to tighten the saw blade 28, the other end of the outputting shaft 30 mounted a gear 40, the outer toothed ring 42 of the gear 40 meshed with the motor shaft 27 to transmit the rotation of the motor 26 to the output shaft 30. When the motor 26 works, it always rotates in a single direction and drives the output shaft and the saw blade rotating to realize cutting. To enable the output shaft 30 can be prevented from rotating when the operator uses a tool, such as wrench, to loose and secure the fastener 37, the first preferred embodiment of the present invention provides a spindle locking mechanism that moves axially to lock and unlock the output shaft.

In the preferred embodiment, the driving device comprises a gear 40 arranged between the motor 26 and the output shaft 30 and driven by the motor 26. The gear is a transmitting member.

Figure 2:
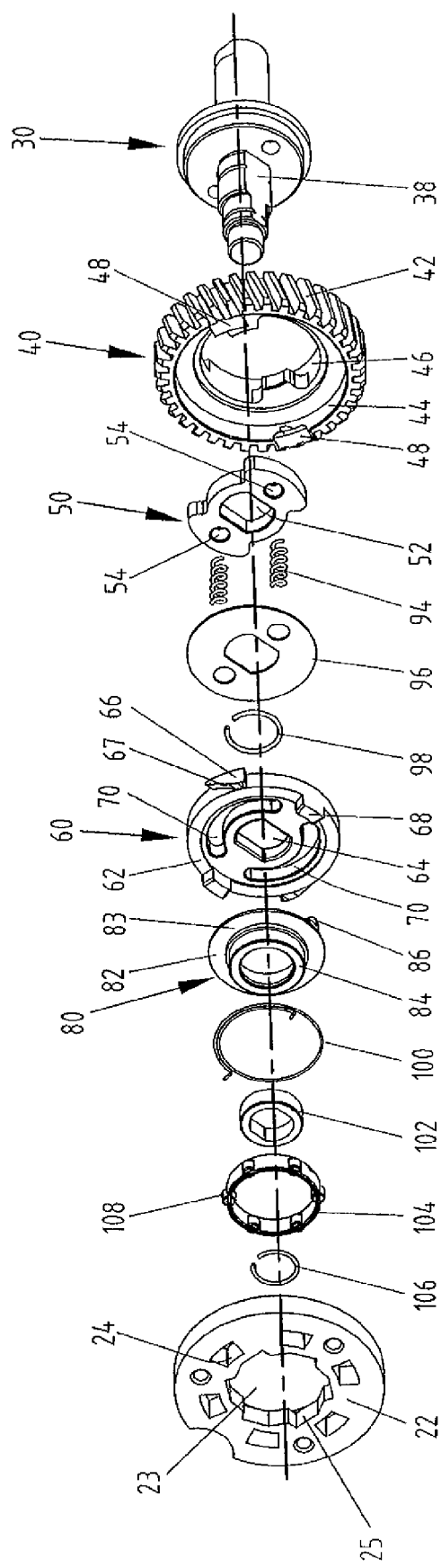
FIG. 2 is an exploded view of a output shaft locking mechanism of the circular saw according to the first preferred embodiment of the present invention.
Figure 6:
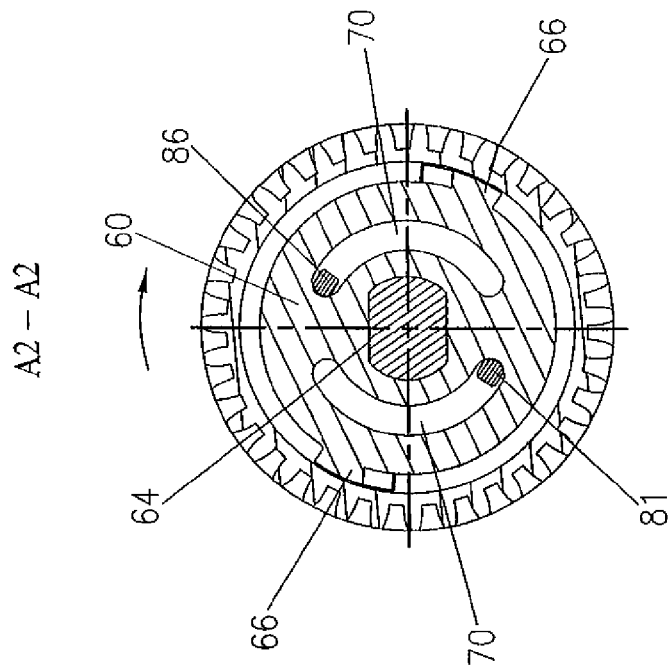
FIG. 6 is a cross-sectional view taking along line A2-A2 of FIG. 4.
Figure 5:
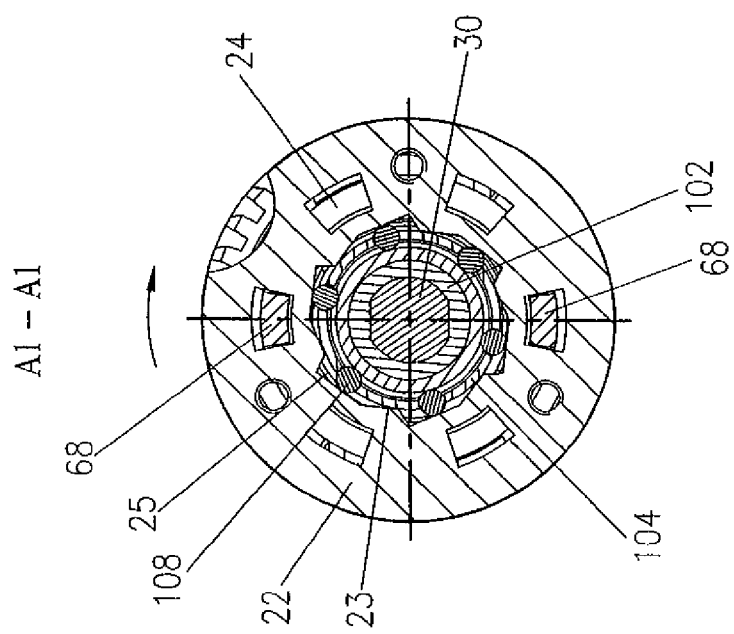
FIG. 5 is a cross-sectional view taking along line A1-A1 of FIG. 4.

Referring to FIG. 2 and FIG. 3, the end of the output shaft 30 that mounts the gear 40 comprises a longitudinal flat portion 38, the output shaft locking mechanism according to the first preferred embodiment of the present invention comprises a sector driving member 50, an axially movable locking device 60, a first stopping member 80 that rotates always in a single direction and a compression spring 94 that provides a elastic force urging the locking device 60 axially moving, which can be connected to the flat portion 38 of the output shaft 30.

The housing 22 according to the first embodiment of the present invention provides a central bore 23 though which the flat portion 38 of the output shaft 30 passes and a plurality of a first axial slot 24 arranged along the circumference of the central bore 23, wherein the inner periphery of the central bore 23 proportional spaces a plurality of cam surfaces 25 which is extending along the rotation direction of the saw blade 28.

The inner cavity of the gear 40 forms a column-shaped first receiving space at least partially receiving the locking device 60 and a sector second receiving space for receiving the sector driving member 50, wherein a pair of first radial protrusion 48 is formed on a front portion of the inner circumferential surface in a uniformly and circumferentially distributed manner, and extends inward. Obviously, the position and number of the first radial protrusion 48 can be changed easily, such as three first radial protrusions 48 are distributed on the periphery.

The sector driving member 50 comprises a compressed central bore 52 and a pair of though holes 54 symmetrical formed in the opposite side of the compressed central bore 52 for receiving the compressed spring 94.

The locking device 60 comprises a disc main body 62, a compressed bore 64 formed in the center of the disc main body 62, a pair of second radial protrusion 66 formed on the outer circumferential surface of the disc main body 62 in a uniformly and circumferentially distributed manner and extended outward which can separately couples with the plurality of first radial protrusions 48, a pair of first axial protrusion 68 formed on the front portion of the disc main body 62 and extends forward which can separately couples with the first axial slot 24, and a pair of arc grooves 70 symmetrically defined in the opposite side of the compressed bore 64, wherein the front surface 67 of the second radial protrusion 66 can be formed with a cam surface or curvy surface or oblique surface which axially extends towards the foreword direction along the rotation direction of the saw blade 28 in working station. The second radial protrusion 66, and the first axial protrusion 68 can be integratively constituted with the disc main body 62, or couple to the disc main body 62 via fasteners. The position and number of the second radial protrusion 66 is corresponding to the position and number of the first radial protrusion 48 distributed on the gear 40. The number of the first axial protrusion 68 and the arc groove 70 can't be limited in two, which comprise at least one and can be changed according to the detailed requirement.

The first stopping member 80 comprises an annular main body 82, an annular column body 84 axially extending towards the forward direction from the front surface 83 of the annular main body 82, and a pair of ladder-shaped second axial protrusion 86 symmetrically formed on the rear surface 85 of the annular main body 82 and axially extending towards the rearward direction. The second axial protrusion 86 comprises a first ladder 88, a second ladder 90 and ladder surface 92, in the first preferred embodiment of the present invention, the position and number of the second axial protrusion 86 is directly corresponding to the position and number of the arc groove 70 of the locking device 60, the ladder shape and ladder number of the second axial protrusion 86 also can be changed according to the actual requirement.

The spindle locking mechanism according to the first preferred embodiment of the present invention is assembled as shown in FIG. 4 to FIG. 7. The sector driving member 50 via the compressed central bore 52 is fixedly connected with the flat portion 38 of the output shaft 30, actually the sector driving member 50 can be integrated with the output shaft 30. The locking device 60 via the compressed bore 64 is axially movably connected with the flat portion 38 of the output shaft 30, the first axial protrusions 68 detachably inserts the first axial slots 24 of the housing 22. The gear 40 is rotatablely mounted, but axially restrained in the output shaft 30 via a washer 96 and a clip ring 98, simultaneously movably connected with the sector driving member 50 and the locking device 60. The arc of the sector shape of the second receiving space 46 is greater than the sector driving member 50 such that the gear 40 may be rotated by a special angle of α, preferably within the 50 degrees to 80 degrees. The rotation of the gear 40 causes the rear surface (not shown) of the first radial protrusion 48 contacting or departing from the front surface 67 of the second radial protrusion 66. The inner circumferential surface of the annular column body 84 of the first stopping member 80 receives a bearing 102 providing a compressed central bore to be rotatably mounted with the output shaft 30, and the outer circumferential surface thereof is connected to the central bore 23 of the housing 22 via a single-direction clutch 104 which comprises a plurality of balls 108, wherein the plurality of balls 108 of the clutch 104 are separately meshed with the plurality of the cam surfaces 25 of the central bore 23. The first ladder 88 of the second axial protrusion 86 in the rear of the first stopping member 80 is rotatablely received within the arc groove 70 of the locking device 60 so as to the front surface of the arc groove 70 can be pressed against the rear surface 85 of the first stopping member 80. The compressed spring 94 is received within the though hole 54 of the sector driving member 50, one end of the compression spring 94 is pressed against the rear surface of the locking device 60 and the opposite end of the compressed spring 94 is pressed against the shoulder of the output shaft.

Referring to FIG. 4-FIG. 7, the locking device 60 is connected to the housing 22 to cause the output shaft 30 positioned in the locking position. When the motor 26 is actuated, the motor shaft 27 drives the gear 40 rotating with respect to the output shaft 30 in the direction indicated by arrow so as to make the opposite surface 45 of the sector second receiving space separately meshed with the opposite surface 56 of the sector driving member 50, thus drives the sector driving member 50 and thus the output shaft 30 to rotate for driving the saw blade 28 to perform cutting.

Figure 8:
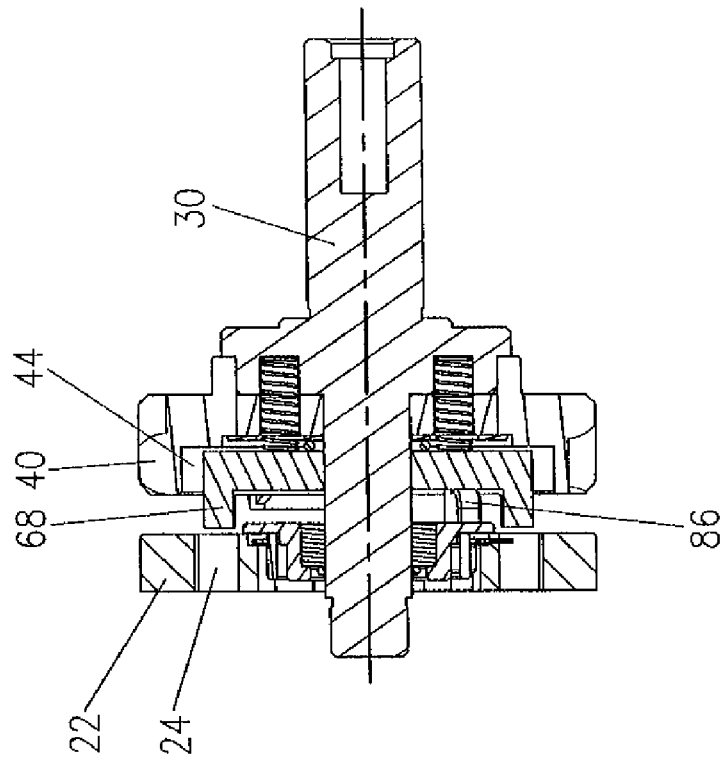
FIG. 8 is a cross-sectional view of the output shaft locking mechanism of the circular saw according to the first preferred embodiment of the present invention, wherein the locking mechanism is positioned in the unlocking position.
Figure 7:
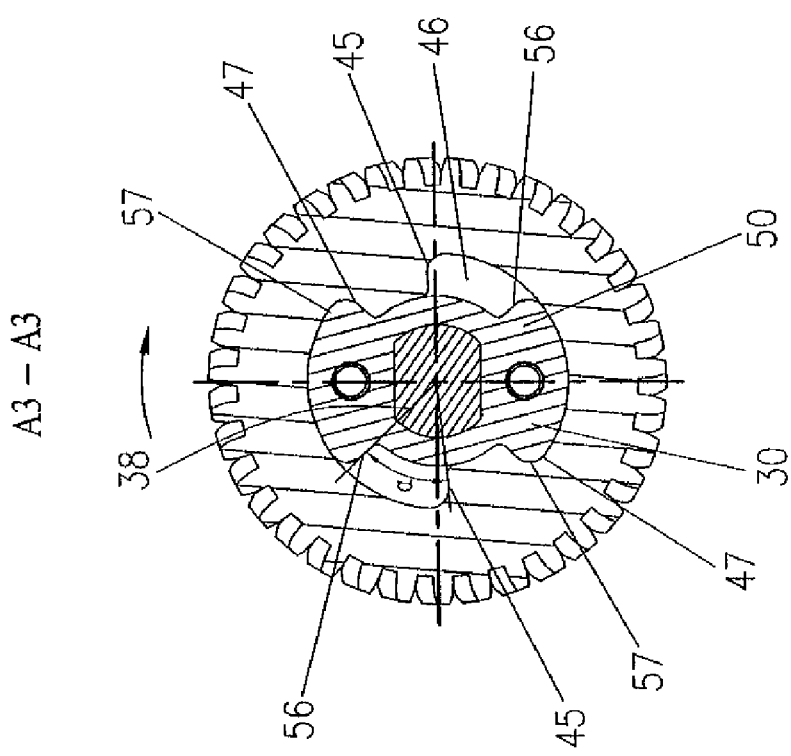
FIG. 7 is a cross-sectional view taking along line A3-A3 of FIG. 4.

While the gear 40 rotates relative to the output shaft 30, the rear surface of the first radial protrusion 48 of the gear 40 rotatablely meshes with the front surface 67 of the second radial protrusion 66 of the locking device 60 to press the locking device 60 axially moving backward and further contained in the column-shaped first receiving space 44, and the first axial protrusion 68 of the locking device 60 separates form the first axial slot 24 of the housing 22 to release the output shaft 30 as shown in FIG. 8. When the locking device 60 axially draws back, the arc groove 70 of the locking device 60 changes from meshing with the first ladder 88 of the second protrusion 86 of the first stopping member 80 to mesh with the second ladder 90, and the side surface of the arc groove 70 contacts with the side surface of the second ladder 90 to drive the first stopping member 80 rotating together with the output shaft 30.

The operator releases the switch, thus cutoffs the electric connection of the power source and the motor 26. When the motor initially stops, the rotation speed of the gear 40 correspondingly reduces, however, the output shaft 30 maintains continuous rotating in a high speed by the inertia of the saw blade 28 and driving the locking device 60 rotating relative to the gear 40, to cause the second radial protrusion 66 of the locking device 60 departed from the first protrusion 48 of the gear 40. The elastic force of the compression spring 94 biases the locking device 60 axially moving forward to cause the front surface of the arc groove 70 of the locking device 60 depressed against the ladder surface 92 of the second axial protrusion 86 of the first stopping member 80 for preventing the output shaft 30 being locked abruptly, therefore avoid to hurt the motor 26.

When the circular saw has stopped to change the saw blade 28, in order to restrict the following rotation of the output shaft 30 and lock the output shaft 30, the operator manually rotates the saw blade 28 in a converse direction of the saw blade rotates for work, thus the first stopping member 80 conversely rotates to make the balls 108 of the single-direction clutch 104 pressed more and more tight by the cam surface 25 of the housing 22 so as to prevent the converse rotation of the first stopping member 80. But the locking device 60 is driven by the output shaft 30 to further conversely rotate relative to the first stopping member 80 to cause the front surface of the arc groove 70 of the locking device 60 departs from the ladder surface 92 of the first stopping member 80. At the same time the elastic force of the compressed spring 94 drives the locking device 60 axially moving forward so as to the front surface of the arc groove 70 presses against the rear surface of the first stopping member 80, and the first axial protrusion 68 inserts the first axial slot 24 of the housing 22, thereby the output shaft is locked. As soon as the first axial protrusion 68 inserts the first axial slots 24, the whole locking device 60 is in a relative stable state to prevent the rotation of the output shaft 30. The operator doesn't keep an additional force to maintain the locking device keeping in the locking state, consequently disassemble and assemble the saw blade easily.

In the first preferred embodiment of the present invention, because the locking device can't position completely in the locking position after the motor stops, and the operator must conversely rotate the saw blade to lock the locking device in a stable locking position, that is a half-automatic output shaft locking mechanism.

The difference between the second preferred embodiment of the present invention and the first preferred embodiment is to provide an output shaft locking mechanism radially moving to lock and release the output shaft.

Figure 9:
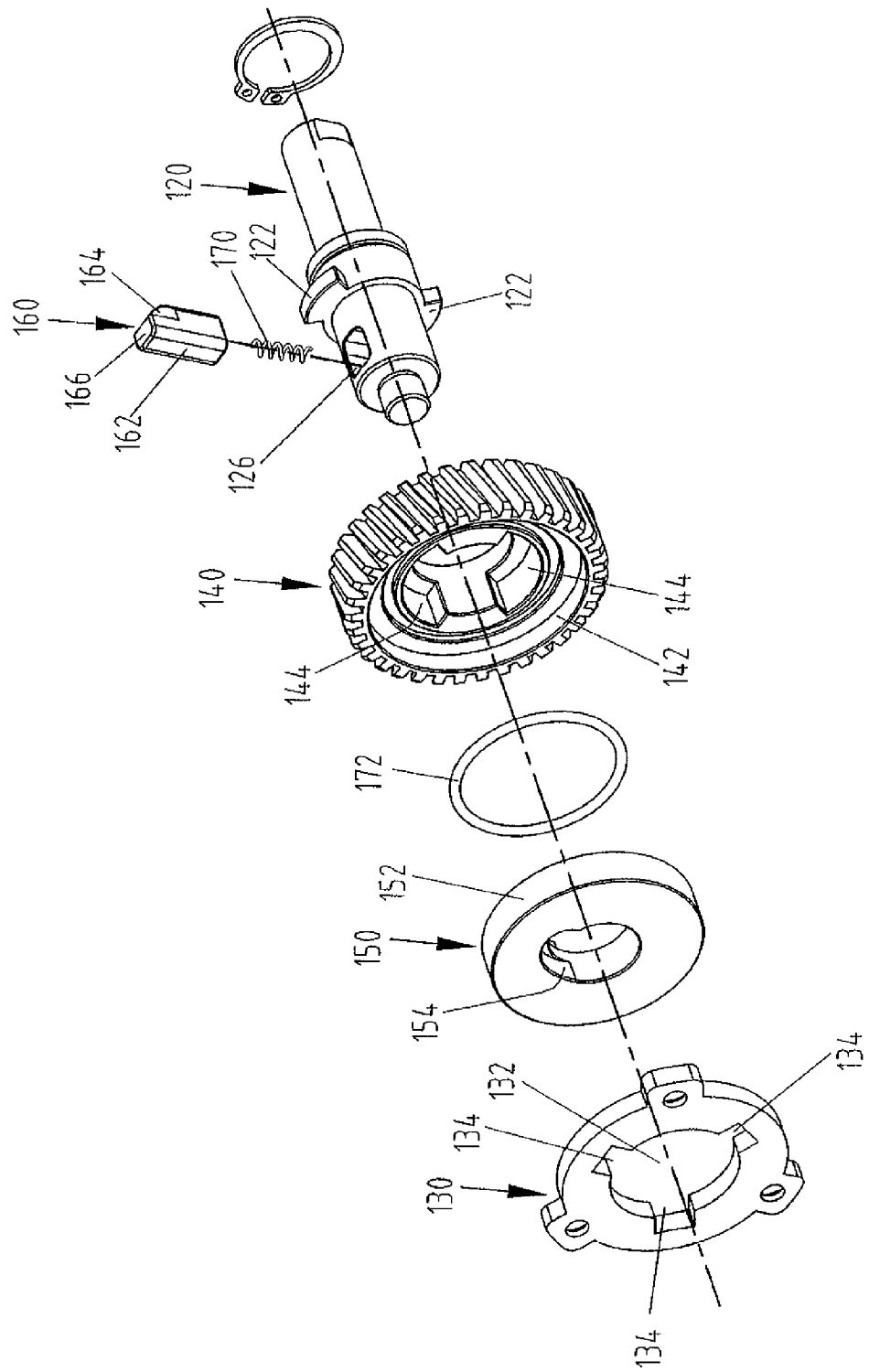
FIG. 9 is an exploded view of the output shaft locking mechanism of the circular saw according to a second preferred embodiment of the present invention.
Figure 12:
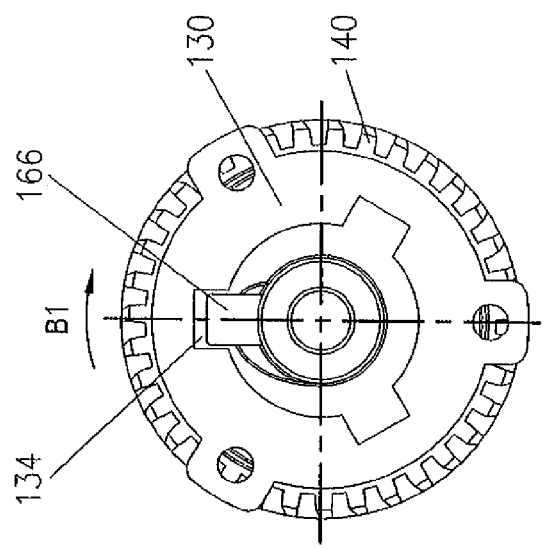
FIG. 12 is a view taking along the direction B1 of FIG. 11.
Figure 10:
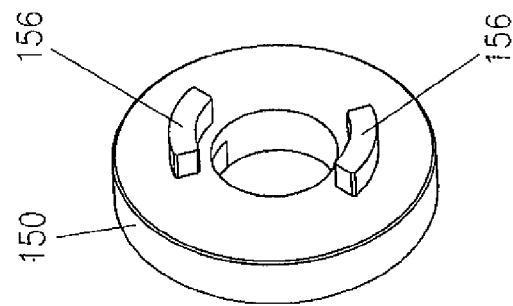
FIG. 10 is a rear perspective view of a second stopping member according to the second preferred embodiment of the present invention.
Figures 13, 14, 15:
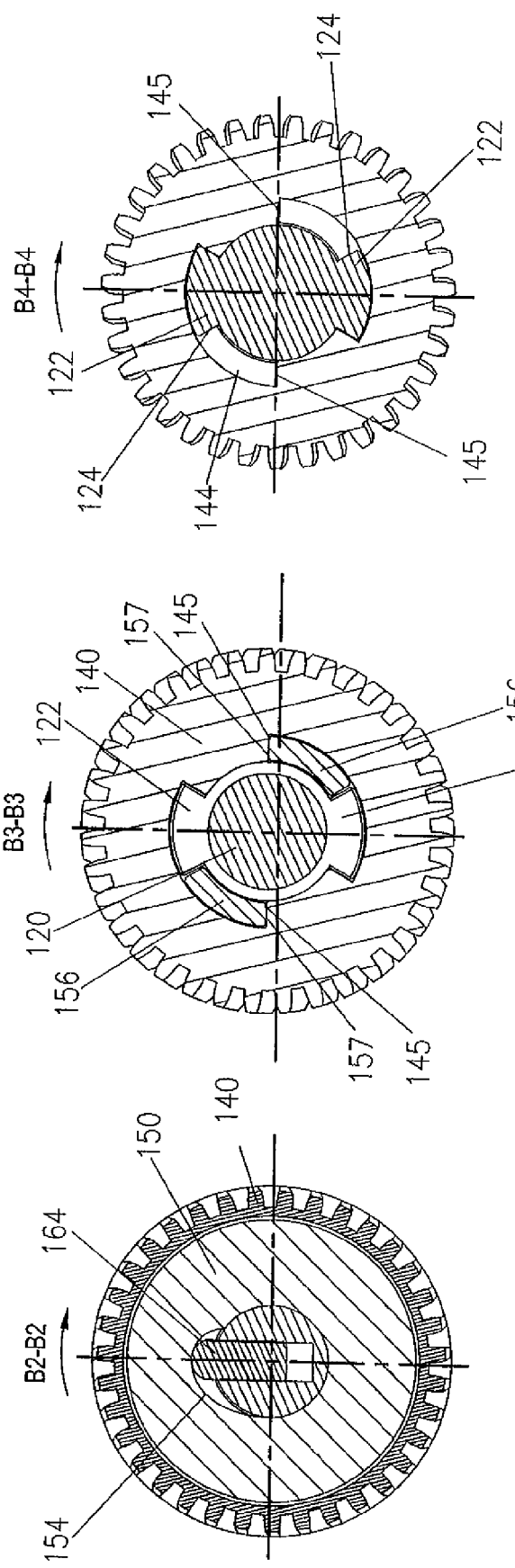
FIG. 13 is a cross-sectional view taking along the line B2-B2 of FIG. 11.
FIG. 14 is a cross-sectional view taking along the line B3-B3 of FIG. 11.
FIG. 15 is a cross-sectional view taking along the line B4-B4 of FIG. 11.
Figure 20:
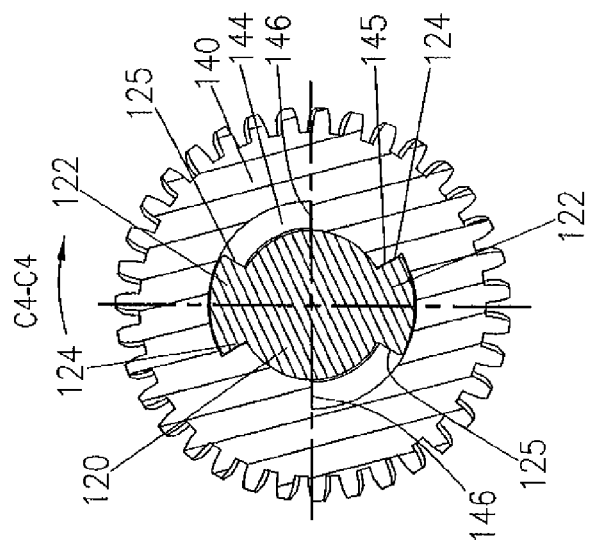
FIG. 20 is a cross-sectional view taking along the line C4-C4 of FIG. 16.
Figure 19:
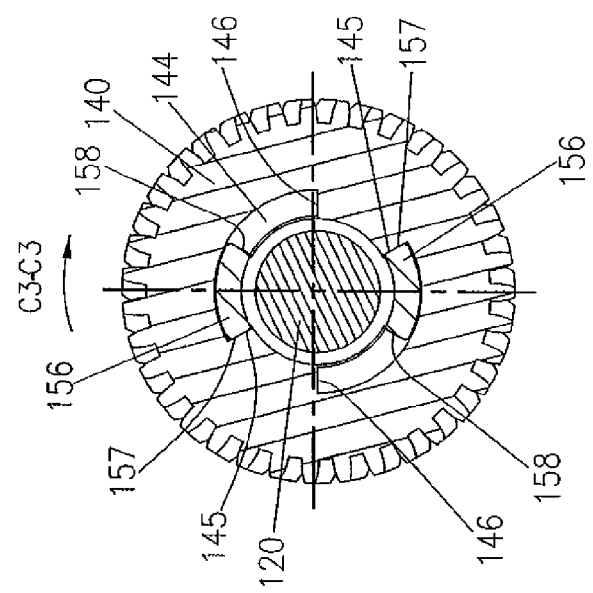
FIG. 19 is a cross-sectional view taking along the line C3-C3 of FIG. 16.
Figure 18:
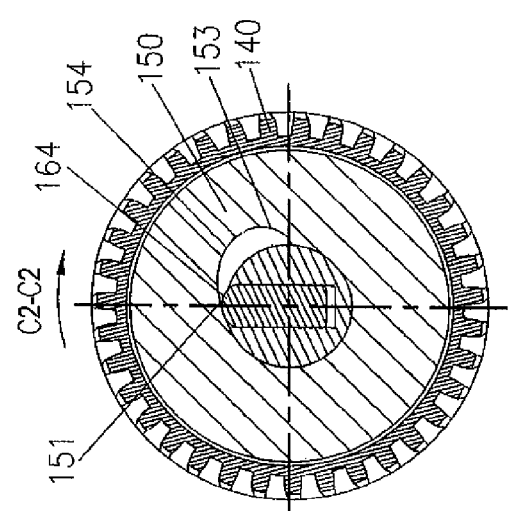
FIG. 18 is a cross-sectional view taking along the line C2-C2 of FIG. 16.

Referring to the FIG. 9 and FIG. 10, the output shaft 120 of this preferred embodiment has defined an integrative sector driving member 122 and a radial blind hole 126.

The housing 130 comprises a central bore 132 though which the output shaft 120 can be passed and a plurality of radial slots 134 distributed around the circumference of the central bore 132.

The cavity of the gear 140 is formed with a column-shaped first receiving space 142 for partially receiving a second stopping member 150, and a sector second receiving space 144 for receiving the sector driving member 122.

The second stopping member 150 comprises an annular main body 152, the front portion of the inner circumference of the main body 152 defined a cam surface 154 which radially extends along the direction of the saw blade 28 rotating for work, a sector protrusion 156 provide in the rear surface of the annular main body 152.

Figure 11:
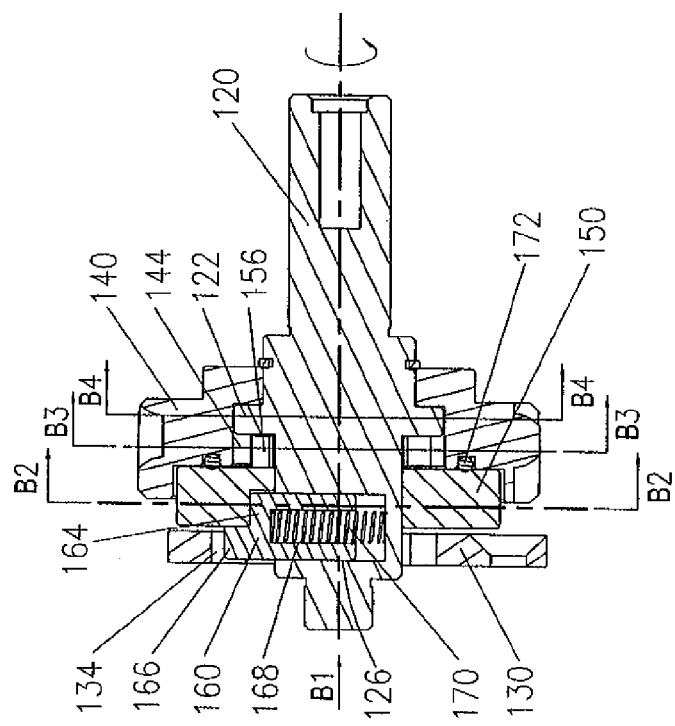
FIG. 11 is a cross-sectional view of a output shaft locking mechanism of the circular saw according to the second preferred embodiment of the present invention, wherein the locking mechanism is positioned in the locking position.

The locking device 160 comprises a column main body 162, one end of the column main body 162 defined a multi-ladder comprising a first ladder 164 and a second ladder 166, the other end of the column main body 162 having a blind hole 168 (shown in FIG. 11) for receiving a compressed spring 170.

The shaft locking mechanism according to the second preferred embodiment of the present invention assembled shown in FIG. 11 to FIG. 15, the gear 140 is rotatably mounted on the sector driving member 122 and is axially fixed in the output shaft 120. The gear 140 can rotate an angle with respect to the output shaft 120 due to the arc of the sector second receiving space 144 is greater than the arc of the sector driving member 122. The second stopping member 150 is rotatably mounted on the output shaft 120 and is contacted with the gear 140 via a friction ring 172, the sector protrusion 156 thereof ratatably contained in the sector second receiving space 144 and axially without-interferential arranged with the sector driving member 122. The end of the locking device 160 which comprises a blind hole 168 for receiving the compression spring 170 is radial-movably received the blind hole 126 of the output shaft 120, wherein the first ladder 164 is received in the cam surface 154 of the second stopping member 150, and the second ladder 166 is detachably connected to the radial slot 134 of the housing 130.

Referring to FIG. 11 to FIG. 15, the locking device 160 is connected to the housing 130 to make the output shaft 120 positioned in the locking position. When the operator presses the switch, the motor 26 is electrically connected with the power source and starts to work, the motor shaft 27 driving the gear 140 rotating along the arrow direction shown in the figures, then the gear 140 driving the second stopping member 150 rotatably relative to the output shaft 120 via the opposite surface 145 of the sector second receiving space 144 meshed with the opposite surface 157 of the sector protrusion 156, and the friction force of the friction ring 172. Simultaneously, the cam surface 154 of the second stopping member 150 presses the top surface of the first ladder 164 of the locking device 160 to make the second ladder 166 depart from the radial slot 134 of the housing 130, thereby the outputting shaft 120 is positioned in a loosening position as shown in FIG. 16 to FIG. 20, and the outputting shaft 120 rotates freely with respect to the housing 130. The gear 140 continuously rotates to make the opposite surface 145 of the sector second receiving space 144 meshed with the opposite surface 124 of the sector driving member 122 for driving the outputting shaft 120 and the second stopping member 150 rotating together.

The operator releases the switch, and cuts off the electrically connection of the motor 26 with the power source, thereby the motor 26 starts to stop and the speed of the gear 140 reduces correspondingly. However, the output shaft 120 in company with the locking device 160 keeping rotating in a high speed because of the inertia of the saw blade. The second stopping member 150 according to the second preferred embodiment has a great weight, which can be overcomes the friction force of the friction ring 172 and synchronized rotating with the output shaft 120 in itself inertia. The cam surface 154 continuously presses the top surface of the first ladder 164 of the locking device 160, which makes the second ladder 166 of the locking device 160 can not radially extend so as to prevent the sudden locking of the output shaft 120 and avoid the hurt of the motor 26. When the output shaft 120 and the second stopping member 150 rotates an angle relative to the gear 140, the opposite surface 125 of the sector driving member 122 and the opposite surface 158 of the sector protrusion 156 of the second stopping member 150 separately meshed with the opposite surface 146 of the second receiving space 144, thereby driving the gear 140 and the outputting shaft 120 synchronized rotating with the second stopping member 150 until stop.

To lock the output shaft 120, the operator manually reversely rotates the output shaft 120 relative to the rotation direction of the saw blade 28 works, thus making the output shaft 120 driving the locking device 160 reversely rotating with respect to the gear 140, and drives the second stopping member 150 to overcome the friction force of the friction ring 172 and reversely rotate relative to the gear 140 due to the top end portion of the first ladder 164 of the locking device 160 is under the compressed phase 151 of the camp surface 154 of the second stopping member 150. Thus the opposite surface 125 of the sector driving member 122 and the opposite surface 158 of the sector protrusion 156 of the second stopping member 150 both separate from the opposite surface 146 of the second receiving space 144. Then rotate the output shaft 120 manually along the rotation direction of the saw blade 28 works. At that moment the second stopping member 150 keeps static relative to the gear 140 due to the friction force of the friction ring 172 whilst the output shaft 120 drives the locking device 160 rotating to the release phase 153 of the cam surface 154 of the second stopping member 150. In that way to loosen the locking device 160 and its second ladder 166 moves in the radial direction to insert into the radial slot 134 of the housing. So the output shaft 120 is locked.

In the second preferred embodiment of the invention, after the motor stopping, the locking device is under the locking state completely. The operator needs to rotate the saw blade 28 reversely to have the locking device be under the stable locking position. So the locking device is a half-automatic device locking output shaft.

The third preferred embodiment of the invention discloses the circular saw 200 including locking device that has the electromagnetic assembly 260. The structures which are same as the first embodiment and the second embodiment's in this embodiment are used the same sign to label. So there is no need to say more than is needed.

Figure 21:
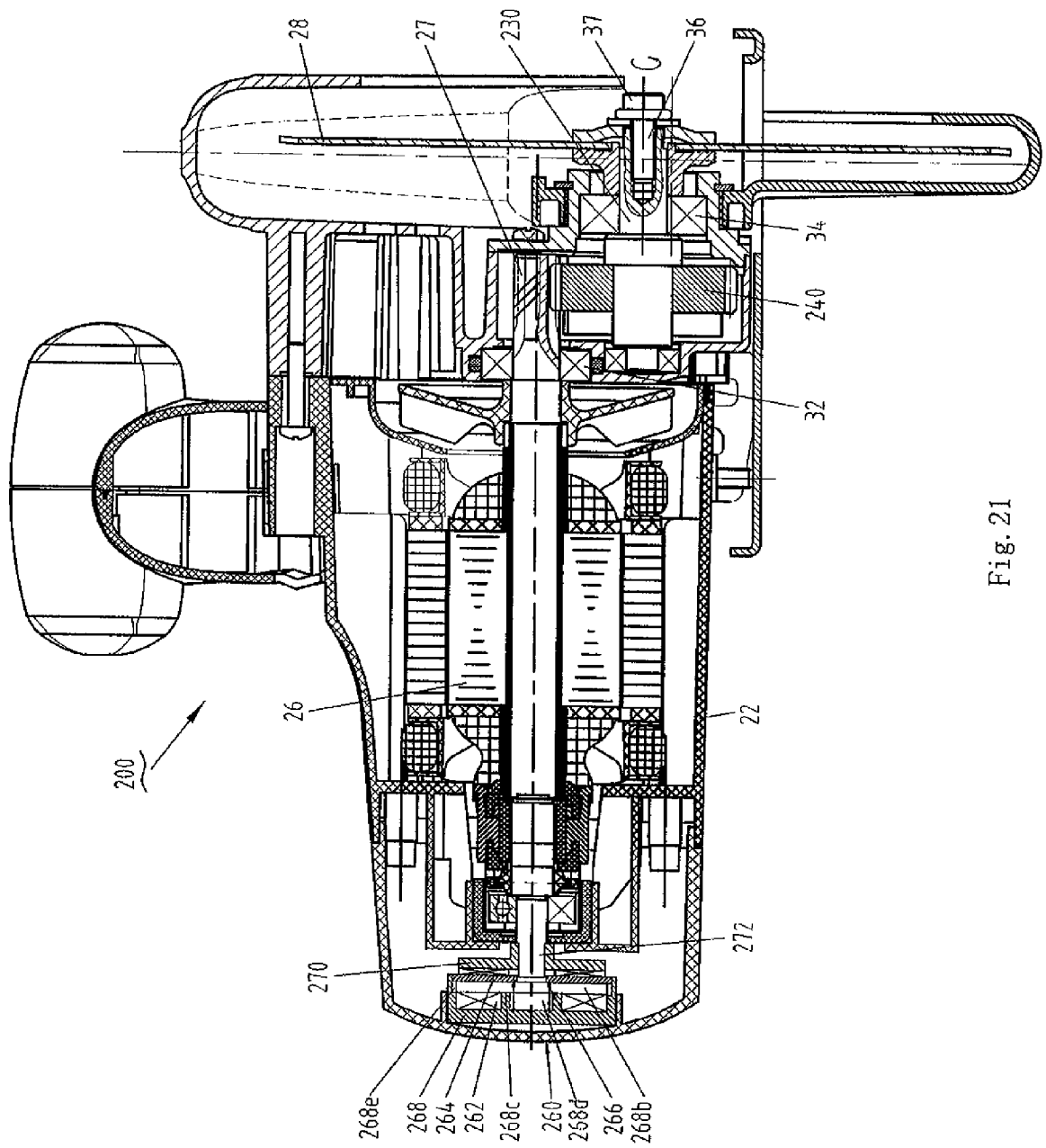
FIG. 21 is a cross-sectional view of a circular saw according to a third preferred embodiment of the present invention, wherein the locking mechanism is positioned in the locking position.
Figure 23:
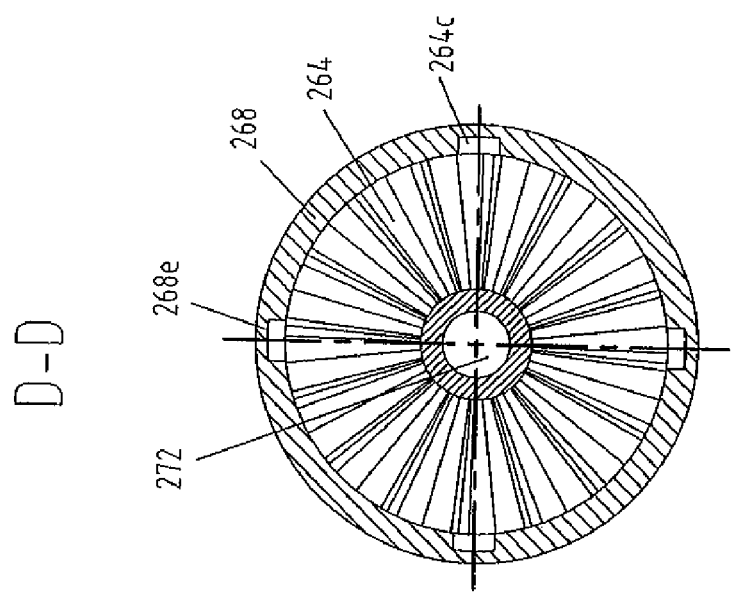
FIG. 23 is a cross-sectional view taking along the line D-D of FIG. 22.
Figure 22:
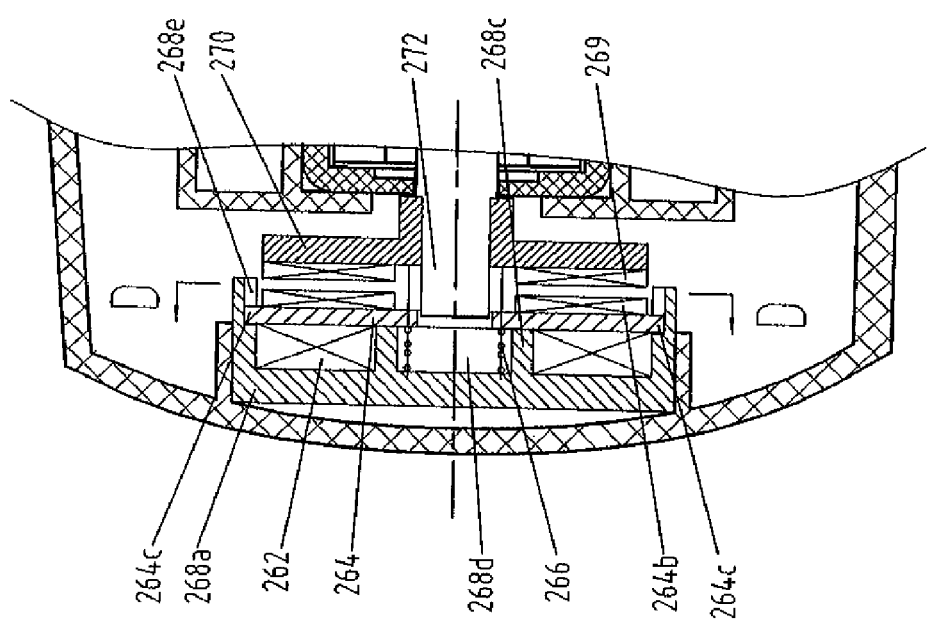
FIG. 22 is a cross-sectional view of a circular saw according to the third preferred embodiment of the present invention, wherein the locking mechanism is positioned in the unlocking position.
Figure 24:
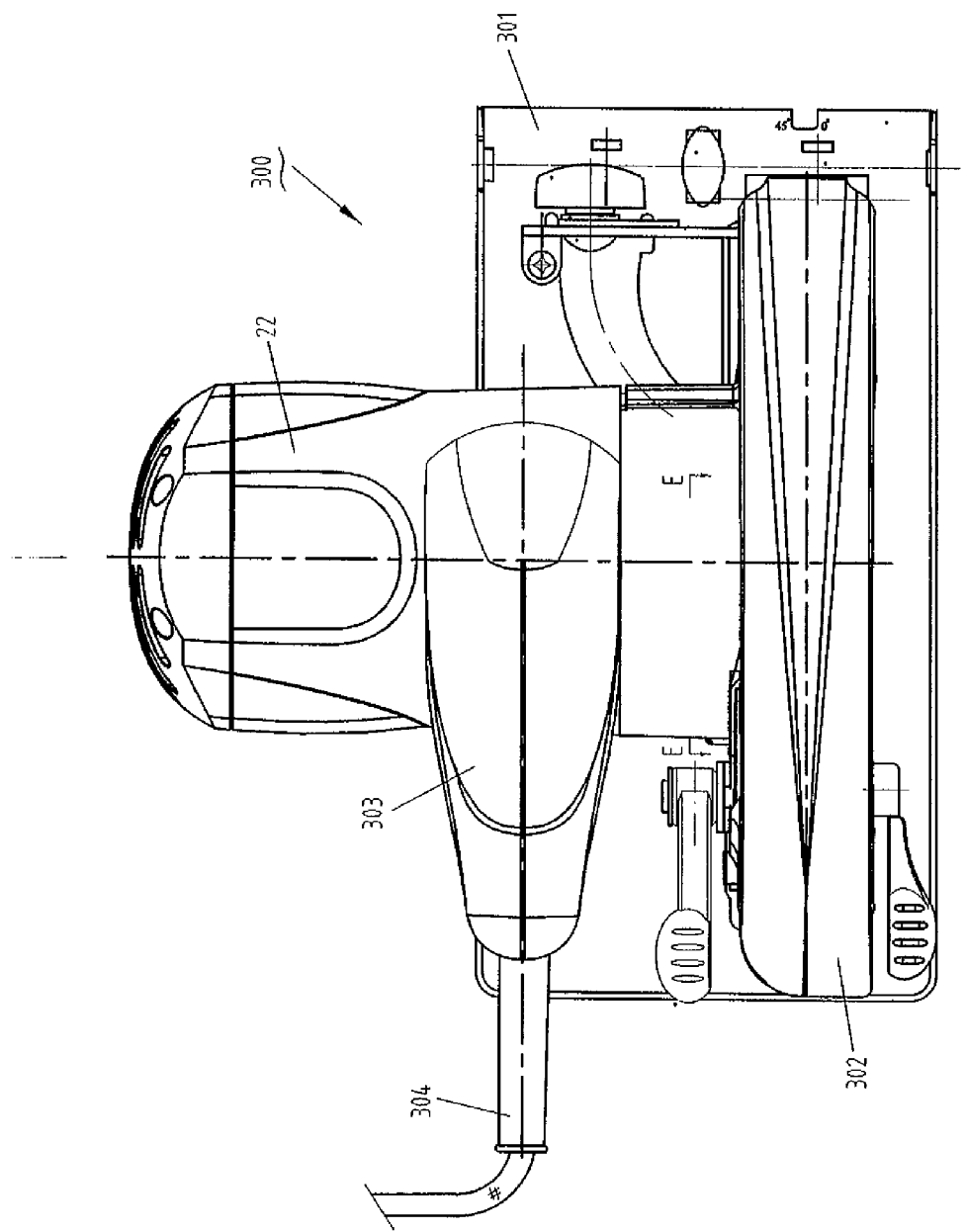
FIG. 24 is a top view of a circular saw according to a fourth preferred embodiment of the present invention.
Figure 26:
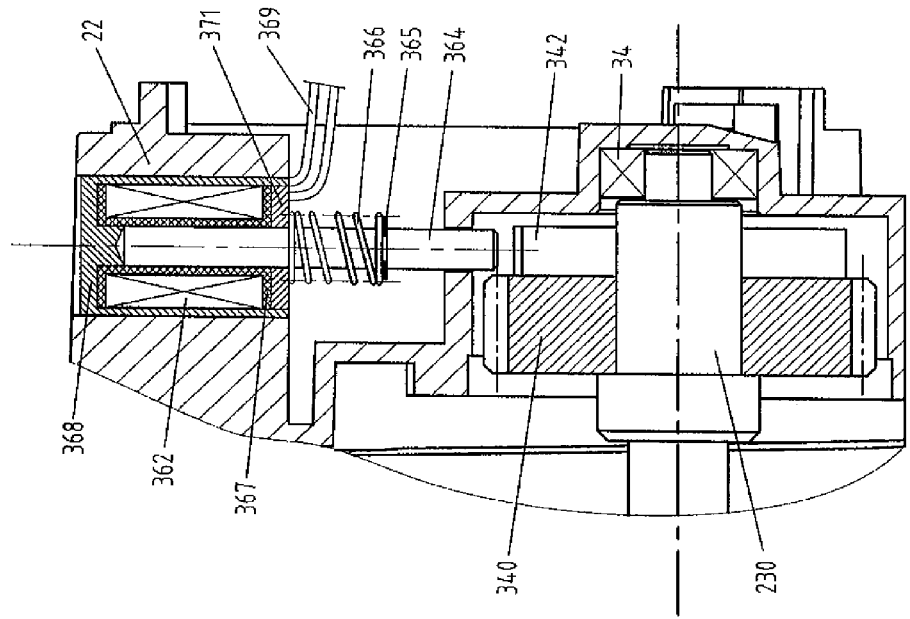
FIG. 26 is a partial cross-sectional view taking along a line E-E of FIG. 24, wherein the locking mechanism is positioned in the unlocking position.
Figure 25:
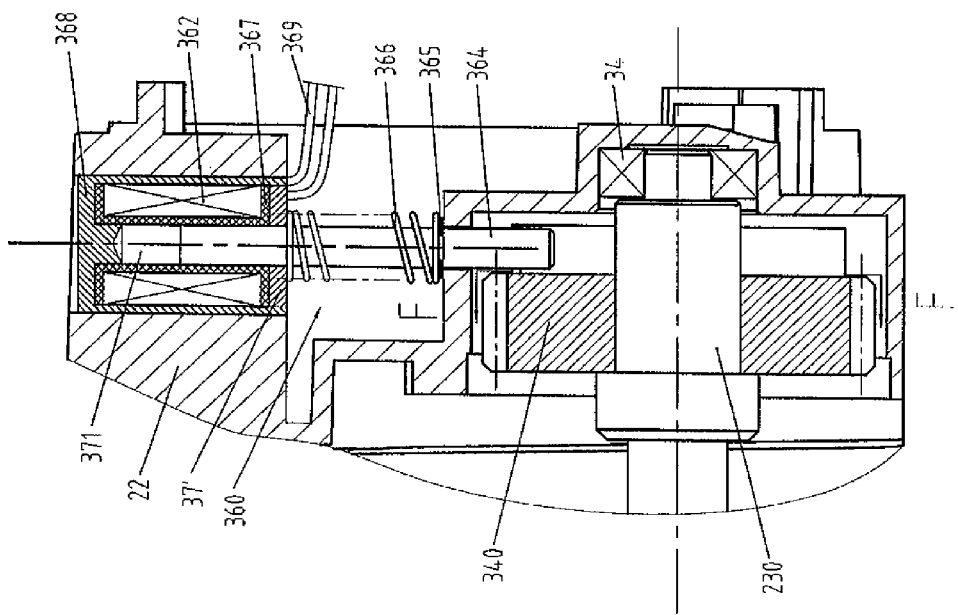
FIG. 25 is a partial cross-sectional view taking along a line E-E of FIG. 24, wherein the locking mechanism is positioned in a locking position.
Figure 27:
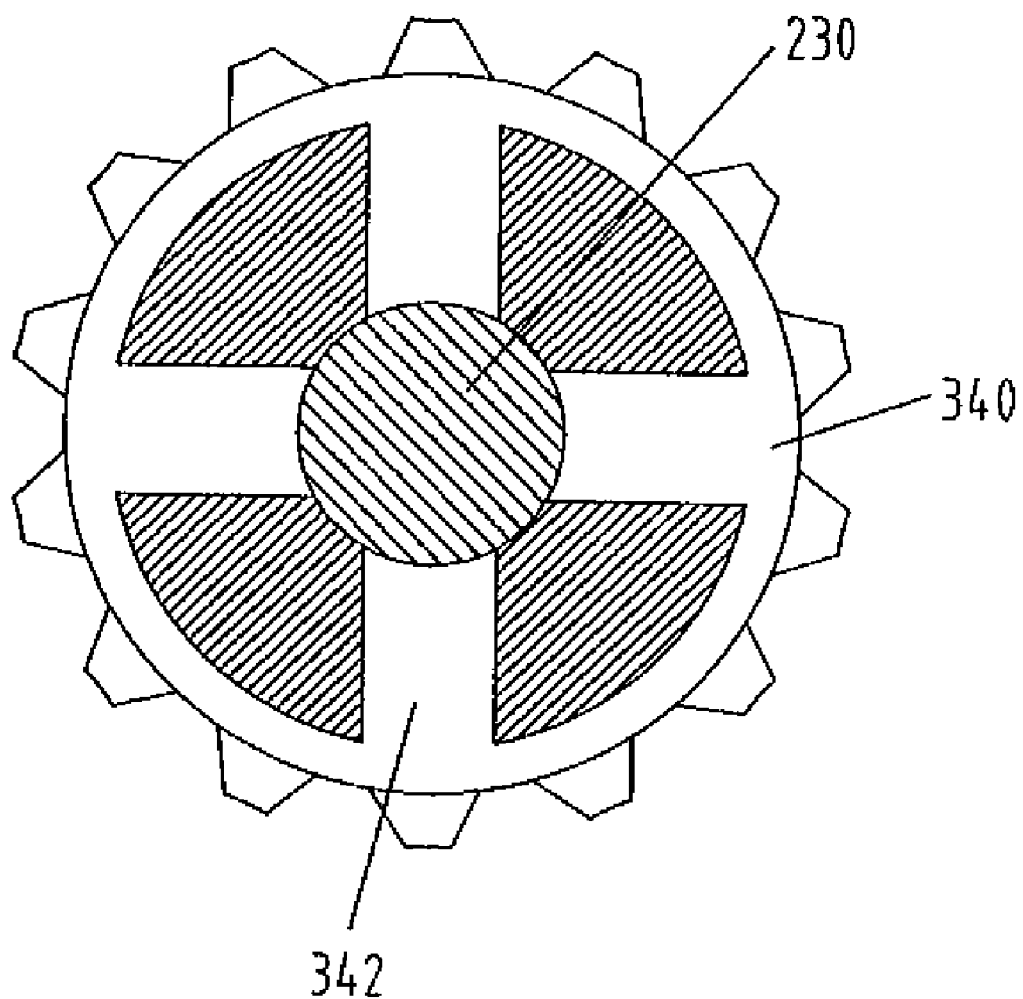
FIG. 27 is a partial cross-sectional view taking along a line F-F of FIG. 25.

Referring to the FIG. 21-FIG. 23, in this embodiment shown, the driving device of the locking device includes the electromagnetic assembly 260 mounted in the housing 22 and connected with locking device. The electromagnetic assembly 260 includes the electromagnetic base 268, the winding 262 mounted in the electromagnetic base 268. The locking device includes the transmitting member 264 moving relative to the winding 262, the fixed member 270 fixed with the motor shaft 27, the elastic member 266 mounted between the winding 262 and the transmitting 264. The fixed member is the fixed toothed disc 270 mounted in the end portion that apart from the transmitting member of the motor shaft. The fixed toothed disc 270 includes the almost annular main body, some fixed tooth 269 mounted in the one end portion of the main body. The fixed toothed disc 270 is fixed with the motor shaft and can rotate with the motor shaft. The transmitting member 240 is the gear fixed with the output shaft 230.

The electromagnetic base 268 has a annular column shaped main body including the receiving groove 268b used to receive the winding 262, the annular protrusion 268c mounted in the main body 268a along the axial direction, the elastic member 266 received in the inner cavity 268d of the annular protrusion 268c. The main body 268a has a number of grooves 268e along the radial direction around the inner circular edge.

The transmitting member is a movable toothed disc 264 in this embodiment, comprising the almost annual main body 264a, the movable end tooth 264b mounted in the main end portion, the protruding portion 264c mounted in the main body 264a in the radial direction around the external annular edge. The number and the angle interval are corresponding to the groove's 268e.

The elastic member 266 is a compressed screwed spring. One of its ends is pressed against the inner cavity 268d of the electromagnetic base 268 and the other end is pressed against the end portion of the movable toothed disc 264 facing to the movable end tooth 264b.

When the power is not connected, there is no current going through the winding 262 of the electromagnetic assembly 260. The movable end tooth 264a of the movable toothed disc 264 meshes with the fixed end tooth 269 of the fixed toothed disc 270 due to the elastic force putting on the movable toothed disc 264 coming from the elastic member 266. The movable toothed disc 264 is under the locking state. The motor is not started and the motor shaft 27 is static. If the saw blade 28 needs to be assembled or disassembled, the operator will rotate the saw blade 28. Because the movable end tooth 264a meshes with the fixed end tooth 269, the movable toothed disc 264 is static referring to the housing 22. So the motor shaft 27 fixed with the fixed toothed disc 270 will not rotate with the saw blade 28. At that moment the output shaft 230 is nonrotatable, means under the locking state. Once the locking device turns into the locking state, the operator doesn't need to put an additional force to keep the locking device on locking state. The operator can disassemble the nut of the saw blade 28 by tool and do not need to use one hand to loosen the nut 37 while the other hand used to lock the motor shaft 27. So the process of assembly and disassembly can be easier and safer.

Once the power is connected, the electromagnetic assembly 260 is powered. The current goes through the winding 262 received in the receiving groove and the magnetic force is produced which can overcome the elastic force coming from the elastic member 266 to pull out the movable toothed disc 264 from the fixed end tooth 269. When the motor 26 is started, the motor shaft 27 can rotate freely and drive the transmitting member 240 to rotate. In that way can rotate the saw blade 28. At that moment, the output shaft 230 is under the rotatable state, means the locking device is loosened.

Because the electromagnetic assembly 260 can produce the magnetic force when the switch is closed and drive the movable toothed disc 264 moving along the axial direction of the output shaft 230. That can loosen the output shaft 230. After the motor stops for a while, the winding 262 will lose the magnetic force putting on the movable toothed disc 264 and the movable toothed disc 264 will be drove by the force of the elastic member 266 to move along the opposite direction to lock the output shaft 230. The output shaft will be locked or loosen synchronization with the power ON or OFF. So the operator does not need to check whether the output shaft is locked or loosened. It can be easier to assemble or disassemble the saw blade by tool.

Because there are several teeth set on the movable toothed disc 264 and the fixed toothed disc 270, they can chuck with each other in 360 degrees.

The general technician in the filed knows that the fixed member not only can be set in the end portion of the motor shaft apart from the transmitting member, but also can be set in the position near the motor fan.

The fourth preferred embodiment of the invention discloses the circular saw 300 including the locking shaft device having the electromagnetic assembly 360. There are some structures in this embodiment of the invention are similar to some other said embodiment and use the same sign to label them. So there is no need to say more than is needed. The circular saw including the housing 22, the motor (not shown) contained in the housing 22, the transmitting member (not shown), the handle 303 mounted on the housing 22 and used to drive the circular saw move relative to the workpiece. The guard 302 which is mounted on the base covers the saw blade (not shown). The motor connects with external power supply (not shown) via the electric cable 304 and the switch.

Referring to the FIG. 24-FIG. 27, the locking shaft device is mounted near to the transmitting member in this embodiment.

The electromagnetic assembly 360 is mounted in the housing 22, connects with the circular saw's power via the connected cable 369. The electromagnetic assembly 360 includes the electromagnetic base 368 used to support the winding 362, and the winding 362. The locking device includes the transmitting member 364 relative to the winding 362, the fixed member 340 fixed on the output shaft, the elastic member 366 mounted between the transmitting member 364 and the electromagnetic base 368. The winding connects with power source via the connected cable 369.

In addition, the fixed member fixed on the output shaft 230 is the transmitting member 340. The transmitting member 340 includes the gear and the slot 342 which is mounted in an axial protrusion in the radial direction. The number and the angle interval of the slot 342 can be different according to the different deviser.

The electromagnetic base 368 includes the annular column body which has a winding receiving space, the winding 362 mounted in the fixed frame 367 and contained in the said receiving space, the through hole 370 on the surface of the fixed frame 367, the transmitting member 364 contained in the through hole 370 and can moving axially in the through hole 370, the end cap 371 mounted on the transmitting member and covering the fixed frame 367.

The transmitting member in this embodiment is a pin. The best choice is the iron member 364 which is almost annular-column-shaped. One the end has an annular groove and the clip ring 365 mounted in the annular groove. Pin can be made from any magnetic material, such as iron, steel and so on. The shape of the pin is not limited to the cylinder, but also can be rectangle, ellipse etc. The clip ring and the pin can be a whole, means a cylinder iron with a protrusion on its end.

The elastic member 366 is a compressed spring, one of its ends is pressed against the end portion of the electromagnetic base 368, and the other end is pressed against the end portion of the clip ring 365.

When the power is not connected, there is no current going through the winding 362 of the electromagnetic assembly 360. The iron member 364 is pressed onto the housing 22 under the elastic force of the elastic member 366. The end portion of the iron member 364 meshes with the slot 342 of the transmitting member 340, means in the locking state. So the motor can not rotate and the motor shaft 27 is static. So the transmitting member 340 is static referring to the housing 22 and does not rotate. The output shaft 230 fixed with the transmitting member 340 also is static and can not rotate. If the saw blade 28 needs to be assembled or disassembled, the operator will rotate the saw blade 28. Because the output shaft 230 fixed with transmitting member 340 which is static referring to the housing 22, the output shaft 230 can not rotate with the saw blade 28. At that moment, the output shaft 230 is nonrotatable and under the locking state. The operator can disassemble the saw blade 28 by tool and do not need to use one hand to lock the output shaft 230 while the other hand used to loosen the nut 37. So the process of assembly and disassembly can be easier and safer.

Once the power is connected, the electromagnetic assembly 360 is powered. The current goes through the winding 362 and the magnetic force is produced which can overcome the elastic force coming from the elastic member 366 to pull out the iron 364 from the slot 342 of the transmitting member. When the motor 26 is started, the motor shaft 27 can rotate freely and drive the transmitting member 340 to rotate, In that way can rotate the saw blade 28. At that moment, the output shaft 230 is under the rotatable state, means the locking device is loosened.

Because the electromagnetic assembly 360 can produce the magnetic force when it is powered and drive the iron 364 moving along the radial direction of the output shaft 230. That can loosen the output shaft 230. After the motor stopping for a while, the winding 362 will lose the magnetic force onto iron member 364. The iron member 364 will be drove by the force of the elastic member 366 in the opposite direction to lock the output shaft 230. The output shaft will be locked or loosened synchronization with the power ON or OFF. So the operator does not need to check whether the output shaft is locked or loosened. No need to hold a force onto the locking device. It can be easier to assemble or disassemble the saw blade by tool.

The general technician in the filed knows that the fixed member not only can be the gear fixed with the output shaft, but also can be any element of the transmitting members between the motor shaft and the output shaft.

The fifth embodiment of the invention discloses a router which has a locking device including the electromagnetic assembly 460.

Figure 28:
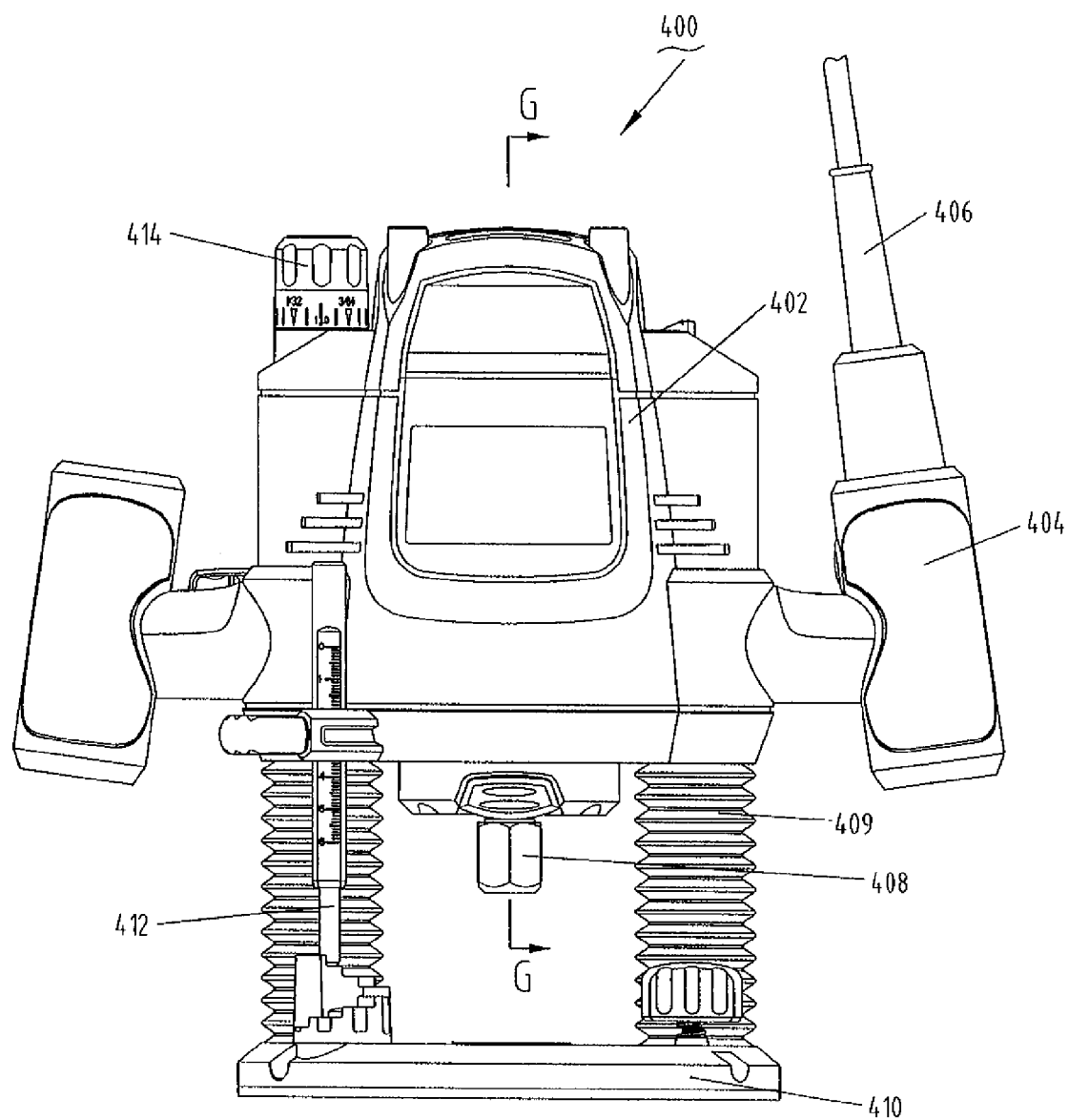
FIG. 28 is a schematic view of a router according to a fifth preferred embodiment of the present invention.
Figure 29:
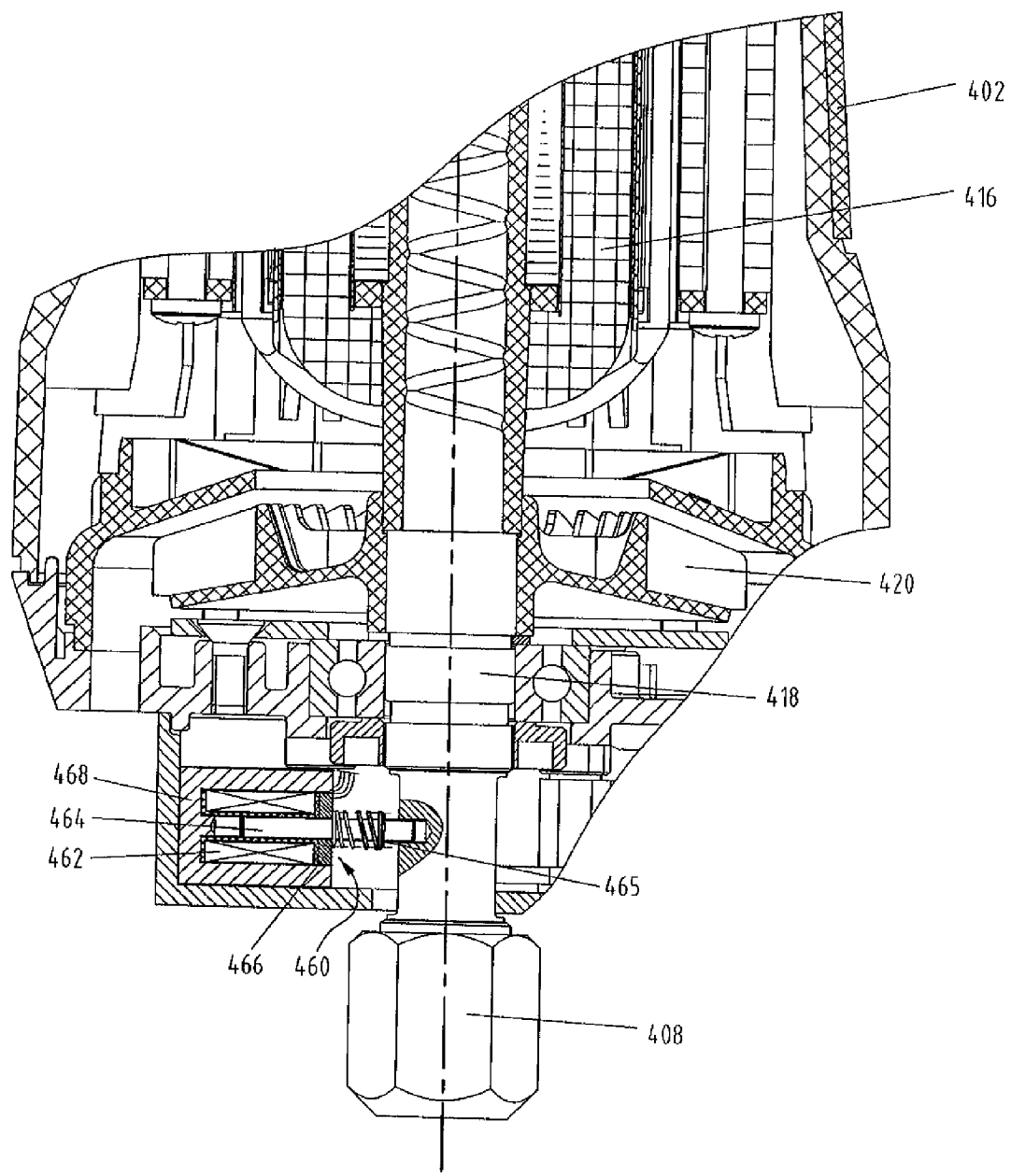
FIG. 29 is a partial cross-sectional view taking along a line G-G of FIG. 28.

In the embodiment referring to the FIG. 28-FIG. 29, the power tool is a router.

The router comprising the housing 402, the motor 416 mounted in the housing, switch connected electronically with the motor, the chuck 408 drove by motor, milling cutter (not shown) mounted in the clamp 408 and connected with the output shaft 418 and rotating with the motor 416. The motor 416 rotates in single direction all the time to make the milling cutter cut the workpiece. The handle 404 mounted on the housing 402, the operator can hold the handle 404 to move the router relative to workpiece (not shown). The electric cable 406 is pulled out from the handle 404 to connect with external power supply and connects with inner circuit through switch. The housing 402 of the router 400 connects with the base 410 through the supporting rod 409. Adjust the distance between the housing 402 and the base 410 to control the cutting depth of the milling cutter through the setting depth vernier and the adjusting knob 414.

The milling cutter needs extremely high speed to keep working. Yet there is no decelerating device between the motor 416 and the clamp 408. The output shaft 418 on the end portion of the motor 416 connects directly with the clamp 408. Under the operating state, the motor drives the clamp to rotate in a single direction to cut the workpiece.

The router 400 has locking device. In this embodiment, the electromagnetic 460 mounted in the housing and near to the position of the output shaft. The electromagnetic 460 connects with the power of the router via the connected cable 469. Same as the forth preferred embodiment, the electromagnetic assembly 460 includes the electromagnetic base 468 to support the winding 462 and the winding 462. The locking device includes the transmitting member 464 which can move along the axial direction relative to winding 462, the output shaft 418, the elastic member 466 mounted between the transmitting member 464 and the electromagnetic base 468. The winding 462 connects with power via the connected cable 469.

Besides, there are some blind holes 470 around the circumference of the output shaft 418 in the radial direction. The number and the angle interval of the blind holes 470 can be different according to the need of the deviser and the blind hole also can be through hole. To strength the rigidity of the output shaft, fixed member which has slots or blind holes can be mounted on the output shaft.

The structure of the electromagnetic base 468 is similar to the electromagnetic base in the forth preferred embodiment. There is no need to say more than is needed.

The transmitting member in this embodiment is similar to the basic column-shaped iron member 464. One of its ends has annulus slot used to receiving the clip ring 465.

When the power is off, there is no current going through the winding 462. The iron member 464 is pressed onto the output shaft 418 under the elastic force of the elastic member 466. The iron member 464's end inserts to the blind hole 470 on the output shaft 418 and be locked. The output shaft 418 can be static relative to the housing 402 and no rotation before the motor being started. If the milling cutter needs to be assembled or disassembled, there is need to rotate the milling cutter, but the output shaft will not rotate with it. At that moment, the output shaft 418 is under the nonrotatable position, the locking device is locked.

Once the power is connected, the electromagnetic assembly 460 is powered on, current goes through the winding 462, the magnetic force will be produced and overcome the elastic force coming from elastic member 466 to pull out the iron member 464 from the blind hole on the output shaft 418. When the motor is powered, the output shaft will rotate and drive the clamp 408 and the milling cutter to rotate. At that moment, the output shaft 418 is under the rotatable position, the locking device is loosened.

To be safe, the third, the fourth and the fifth preferred embodiment of the invention all include the delay circuit in power control circuit. Push or release the switch to control the act of the motor and the electromagnetic assembly. So can lock or unlock the output shaft. Referring to the FIG. 30-FIG. 35, there are three different types of delay circuit used to control the act sequence of the motor and the assembly.

We will explain the detail function of the three kinds of delay circuit combined with the fourth preferred embodiment.

Figure 30:
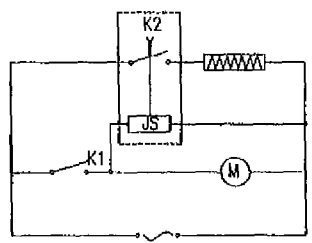
FIG. 30 is an electrical schematic diagram of a control circuitry which is used in the third, forth and fifth preferred embodiments.
Figure 31:
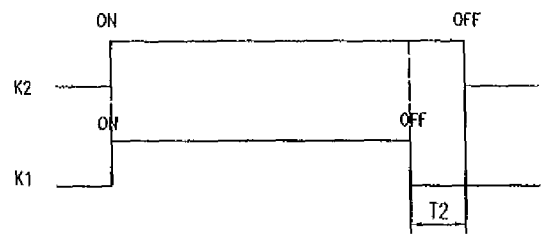
FIG. 31 is a schematic diagram of a work schedule of switches of FIG. 28.

In the delay circuit referring to the FIG. 30, the first switch K1 is used to control the motor, normally, is the main switch of the tool. The second switch K2 is used to control the electromagnetic assembly and is used for delaying and cutting off the circuit in this invention.

Once the tool connected with external power supply and the main switch pushed to close, the first switch K1 and the second switch K2 will close. The motor 26 and the electromagnetic assembly 360 will be powered on. Once the main switch released, the first switch K1 will open and the second switch K2 will open after a time T2 which is decided by the delay circuit JS. In that way to have the locking device act after the motor stopping for a while. After the motor stopping, the saw blade 28 continues to rotate due to the inertia with the speed descending. The winding 362 will lose the magnetic force completely and the iron member 364 will mesh with the slot 342 after the delay circuit JS's action. So it can avoid the locking device to clash the output shaft 230.

Figure 32:
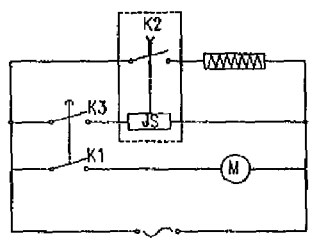
FIG. 32 is an electrical schematic diagram of another control circuitry which is used in the third, forth and fifth preferred embodiments.
Figure 33:
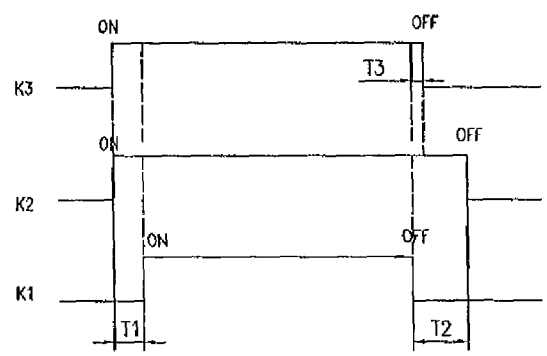
FIG. 33 is a schematic diagram of a work schedule of switches of FIG. 30.

In the delay circuit referring to FIG. 32, the first switch K1 and the third switch K3 is a linkage switch to turn on and turn off the connection between motor and power supply. The second switch K2 is a prolonged cutoff switch used to control the connection state between electromagnetic assembly and power supply.

Once the operator pushes on the main switch, the third switch K3 will close firstly, then the second switch K2 close, so the electromagnetic assembly 360 will be powered on first. The first switch K1 will close after the time T1 to power the motor 26. The motor shaft 27 rotates and drives the transmitting member 340 and the output shaft 230 to rotate synchronization. Once the operator release the linkage switch, the first switch K1 will open first, then the motor loses the power. Release the linked switch completely, the third switch K3 will open after a while T3 (T3>0). At that moment, the second switch K2 is still closed, and the electromagnetic assembly 360 still has current due to the delay circuit. After the first switch K1 opening for a while T2, the second switch K2 open and the delay circuit is powered off, so the electromagnetic assembly 360 loses power and the winding 362 will not have force putting on the iron member 364. The winding 364 will mesh with the slot 342 on the transmitting member to lock the output shaft 230. Because the electromagnetic member 320 is earlier powered than the motor 26, the magnetic force from the winding 362 will pull the iron member 364 out from the slot 342 on the transmitting member to loosen the output shaft 230. In that way can make the motor rotate after the locking device loosening it, and the locking device will not disturb the motor 26.

Figure 34:
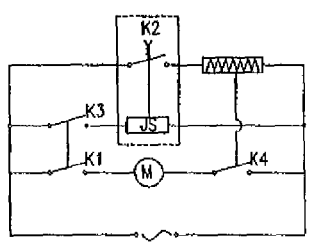
FIG. 34 is an electrical schematic diagram of another control circuitry which is used in the third, forth and fifth preferred embodiments.
Figure 35:
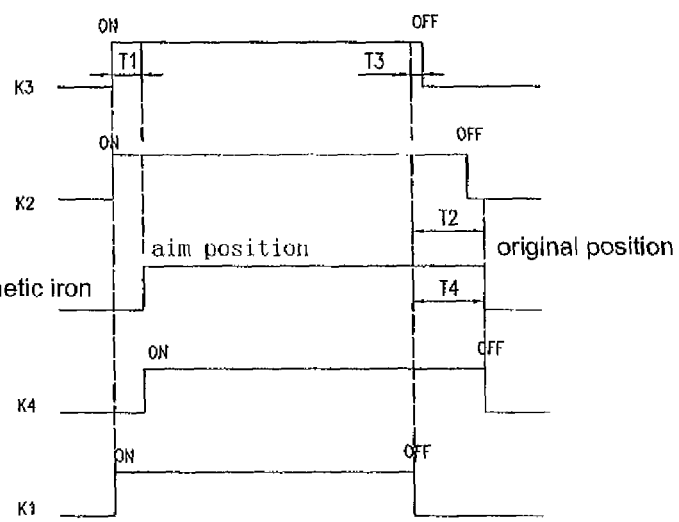
FIG. 35 is a schematic diagram of a work schedule of switches of FIG. 32.

In the delay circuit referring to FIG. 34, the first switch K1 and the third switch K3 is a linkage switch. The second switch K2 is a prolonged cutoff switch. The forth switch K4 connects with iron member 364 contained in electromagnetic assembly 360. Once the operator pushes the linkage switch, the first switch K1, the second switch K2 and the third switch K3 will close at one time. At that moment electromagnetic assembly 360 will get power first, the winding 362 will produce the magnetic force to pull out iron member 364 from slot 342 on the transmitting member. When the iron member 364 separates from the slot 342, the control switch K4 linked with electromagnetic assembly will close and powers the motor 26. The motor shaft 27 rotates and drives the transmitting member 340 and output shaft 230 to rotate. Release the linkage switch, the first switch K1 open immediately, and the motor 26 loses power. The third switch K3 opens after a while T3. The second switch K2 will open after a while T2, then the electromagnetic assembly loses power. After that, the locking device is under the locking state, means the iron member 364 back to its original position, and meshes with the slot 342 in the transmitting member, then the output shaft will be locked. Once the electromagnetic assembly 360 reset completely, means that the first switch has drove the control switch to open after a while T4 (T4>0). So before the motor 26 rotates again, there are two steps that the locking device goes to the loosen position and then the motor 26 is powered. That can avoid the possible safety trouble.

The said delay circuit is applicable to the thirdly preferred embodiment to control the movable toothed disc 264's position relative to fixed toothed disc 270. In the same way, the said delay circuit is also applicable to the fifth preferred embodiment to control the pin's position relative to blind hole.

It is easier for the general technician in this filed to understand that there are some other delay circuits besides that have been disclosed in the invention. There is no need to disclose all the other delay circuit.

Based on this invention, the general technician in the same filed can easily change the said compressed string 90 and 170 to another elastic element, such as metal reed or dish spring. The gear 40 and 140 in the preferred embodiment of the invention can also be changed into other transmitting element, such as cincture wheel connected with motor shaft 27 through the transmitting belt. Besides that, the radial hole which on the output shaft 120 also can be through hole in the second preferred embodiment of the invention. The two locking device 160 can be received in the through hole by moving along the radial direction. The elastic element 170 is mounted between the two locking device. The first stopping member 80 connects with the housing 22 through a single direction rotating axletree junction can achieve the same result. That is also applicable to the second stopping member 150 and the gear 140. In a word, the invention is not limited in the said embodiment. Any embodiment based on the invention belongs to the invention.

What is claimed is:

1. A power tool comprising:
   a housing;
   a motor in the housing;
   a switch connected with the motor and set in the housing; and
   an output shaft connected with a work element,
   wherein the motor drives the output shaft rotationally always in a single direction, and wherein an output shaft self-locking device is set in the housing, and
   wherein the self-locking device is configured to prevent movement from an unlocked position to a locked position when the power is off and the speed of the output shaft is descendent.

2. A power tool according to claim 1, wherein the self-locking device includes a locking device and a driving device, wherein when the switch is pressed down, the driving device drives the locking device from a locking position that prevents the output shaft rotating to a loosening position that permits the output shaft to rotate.

3. A power tool according to claim 2, wherein the driving device includes a transmitting member that is set in the space between the motor and the output shaft and is driven by the motor.

4. A power tool according to claim 3, wherein there is a first axial protrusion on at least one of the locking device and the housing and there is a first axial slot on the other of the at least one of the locking device and the housing, wherein the locking device moves in an axial direction and when it reaches the locking position, the first axial protrusion couples with the first axial slot, whilst when it reaches the loosening position, the first axial protrusion and first axial slot separate from each other.

5. A power tool according to claim 3, wherein there is a first coupling surface on the transmitting member and a second coupling surface on the locking device which can couple with the first coupling surface separately, wherein the transmitting member rotationally drives the first coupling surface to couple with the second coupling surface and drives the locking device from the locking position to the loosening position.

6. A power tool according to claim 5, wherein a first receiving space contained in an inner cavity defined by the transmitting member receives at least a part of the locking device and the first coupling surface is a back end portion of the transmitting member facing the locking device and having at least one first radial protrusion extending from a back circumference of the transmitting member in a radial direction of the receiving space to an inside of the receiving space, wherein the second coupling surface is a forward end portion of the locking device facing the transmitting member and having at least one second radial protrusion extending from a forward circumference in a radial direction of the locking device to an outside of the locking device, wherein when the transmitting member rotates, the first coupling surface presses the second coupling surface to drive the locking device axially movably to the first receiving space.

7. A power tool according to claim 5, wherein the locking device has an elastic member, wherein when the first coupling surface separates from the second coupling surface, the elastic member drives the locking device from the loosening position to the locking position.

8. A power tool according to claim 3, further comprising a first stopping member to couple with the output shaft whilst rotating in a single direction, wherein the first stopping member comprises an annular main body and an annular column body axially extending towards the forward direction from a front surface of the annular main body and wherein the first stopping member has at least two block surfaces, wherein the locking device couples with a different one of the at least two block surfaces of the first stopping member whilst in the locking position and the loosening position.

9. A power tool according to claim 8, wherein the first stopping member is mounted between the housing and the locking device, wherein the first stopping member has a second axial protrusion which is ladder-shaped and extends in the direction of the locking device, wherein the at least two block surfaces are different ladder surfaces on the second axial protrusion, wherein the locking device has an arc groove receiving at least parts of the second protrusion, and wherein when the locking device is in the locking or loosening position, the arc groove is pressed onto different block surfaces on the second protrusion.

10. A power tool according to claim 3, wherein at least one of the locking device and the housing has a radial protrusion and the other of the at least one of the locking device and the housing has a radial slot, wherein when the locking device is in the locking position, the radial protrusion couples with the radial slot, whilst when the locking device is in the loosening position, the radial protrusion separates from the radial slot.

11. A power tool according to claim 3, further comprising a stop member to couple with a single-way rotating bearing, wherein the stop member couples with the transmitting member movably, wherein there is at least one cam surface along a rotating direction of the stop member in an inner annular edge of the stop member, wherein the cam surface couples at least partly with an external end surface, and wherein when the transmitting member rotates, it drives the stop member rotatingly and the cam surface presses the locking device to move the locking device from the locking position to the loosening position.

12. A power tool according to claim 11, wherein the output shaft has a radial hole to receive the locking device, wherein the radial hole receives an elastic body which produces an elastic force to have the locking device loosen the cam surface, and wherein the elastic force drives the locking device to move in the radial direction from the loosening position to the locking position.

13. A power tool according to claim 2, wherein the driving device includes an electromagnetic assembly contained in the housing and windings contained in the electromagnetic assembly, wherein the locking device includes a transmitting member movable in the axial direction relative to the winding and a fixed member fixed to the motor shaft, and wherein after the motor stops, the transmitting member clutches with the fixed member, whilst when the motor starts to rotate, the transmitting member separates from the fixed member.

14. A power tool according to claim 13, wherein the switch is further defined as a first switch used to control the motor and a second switch used to control the electromagnetic assembly, wherein once the first switch opens, the second switch opens after a delayed time.

* * * * *